(12) United States Patent
Takeuchi et al.

(10) Patent No.: US 7,843,909 B2
(45) Date of Patent: *Nov. 30, 2010

(54) PACKET COMMUNICATING APPARATUS

(75) Inventors: Takashi Takeuchi, Hadano (JP); Koji Wakayama, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 113 days.

This patent is subject to a terminal disclaimer.

(21) Appl. No.: 12/216,965

(22) Filed: Jul. 14, 2008

(65) Prior Publication Data

US 2008/0285972 A1 Nov. 20, 2008

Related U.S. Application Data

(63) Continuation of application No. 10/601,880, filed on Jun. 24, 2003, now Pat. No. 7,403,477.

(30) Foreign Application Priority Data

Sep. 3, 2002 (JP) .............................. 2002-257253

(51) Int. Cl.
*H04L 12/50* (2006.01)

(52) U.S. Cl. ...................... 370/386; 370/230; 370/329; 370/389; 370/401; 370/470

(58) Field of Classification Search ................ 370/230, 370/236.2, 329, 352, 389, 390, 397, 401, 370/412, 468, 470
See application file for complete search history.

(56) References Cited

U.S. PATENT DOCUMENTS

| 6,330,241 | B1 | 12/2001 | Fort |
| 6,347,096 | B1 | 2/2002 | Profumo et al. |
| 6,546,014 | B1 * | 4/2003 | Kramer et al. ......... 370/395.41 |
| 6,931,013 | B2 | 8/2005 | Saikusa |
| 7,020,162 | B2 * | 3/2006 | Iwasaki et al. ............... 370/468 |
| 7,076,563 | B1 | 7/2006 | Yamanaka et al. |
| 7,099,305 | B1 | 8/2006 | Fardid |
| 7,317,688 | B2 * | 1/2008 | Mukai et al. ................. 370/236 |
| 2002/0021472 | A1 | 2/2002 | Nakaishi |
| 2002/0063924 | A1 * | 5/2002 | Kimbrough et al. ......... 359/125 |
| 2002/0067529 | A1 | 6/2002 | Yokomoto et al. |
| 2002/0162029 | A1 * | 10/2002 | Allen et al. .................. 713/202 |
| 2003/0065787 | A1 | 4/2003 | Osafune et al. |
| 2004/0037280 | A1 * | 2/2004 | Hein et al. ................... 370/390 |
| 2004/0044789 | A1 | 3/2004 | Angel et al. |
| 2004/0107364 | A1 | 6/2004 | Shin |
| 2004/0196869 | A1 | 10/2004 | Tsuchida et al. |
| 2005/0058139 | A1 | 3/2005 | Monzawa et al. |
| 2005/0276218 | A1 | 12/2005 | Ooghe et al. |

FOREIGN PATENT DOCUMENTS

JP 2002-223228 11/2001

* cited by examiner

*Primary Examiner*—Ayaz R Sheikh
*Assistant Examiner*—Andrew C Lee
(74) *Attorney, Agent, or Firm*—Stites & Harbison, PLLC

(57) ABSTRACT

Bandwidth control over users accommodated under ONU in PON is achieved. BAS sets user bandwidth information obtained during user authorization in OLT. The OLT achieves bandwidth control on a user basis, using bandwidth information set from the BAS. The present invention enables bandwidth control over users under the ONUs.

5 Claims, 24 Drawing Sheets

FIG. 11

| ONU'S MAC ADDRESS | UPSTREAM BANDWIDTH | DOWNSTREAM BANDWIDTH |
|---|---|---|
| a1:b1:c1:d1:e1:f1:g1 | 1 | 1 |
| a2:b2:c2:d2:e2:f2:g2 | 1 | 1 |
| a3:b3:c3:d3:e3:f3:g3 | 2 | 2 |
| a4:b4:c4:d4:e4:f4:g4 | 3 | 3 |
| a5:b5:c5:d5:e5:f5:g5 | 1 | 1 |
| a6:b6:c6:d6:e6:f6:g6 | 2 | 2 |
| ...... | ...... | ...... |
| am:bm:cm:dm:em:fm:gm | Z | P |

FIG. 27

| ATTRIBUTE | ATTRIBUTE NUMBER | VALUE | (NOTE) |
|---|---|---|---|
| User-Name | 1 | test | |
| User-Password | 2 | testpasswd | |
| Framed-Protocol | 7 | 1 | PPP |
| Framed-IP-Address | 8 | 192.168.1.1 | |
| Framed-IP-Netmask | 9 | 255.255.255.0 | |
| Vender-Specific | 26 | 20 | DOWNSTREAM BANDWIDTH |
| (Not assigned) | 17 | 1 | UPSTREAM BANDWIDTH |

PACKET COMMUNICATING APPARATUS

CROSS REFERENCE TO RELATED APPLICATIONS

This application is a Continuation of nonprovisional U.S. application Ser. No. 10/601,880 filed on Jun. 24, 2003, now U.S. Pat. No. 7,403,477. Priority is claimed based on U.S. application Ser. No. 10/601,880 filed on Jun. 24, 2003, which claims the priority of Japanese Application 2002-257253 filed on Sep. 3, 2002, all of which is incorporated by reference.

FIELD OF THE INVENTION

The present invention relates to a packet communicating apparatus and more particularly to a bandwidth control method in PON (Passive Optical Network).

BACKGROUND OF THE INVENTION

In recent years, faster access networks have been developing rapidly, and FTTH (Fiber To The Home) using optical fibers has been coming into widespread use. Optical fiber installation configurations for achieving FTTH fall into three broad categories: (1) SS (Single Star) type networks in which the station of a common carrier and users are connected by an optical fiber with a one-to-one correspondence; (2) ADS (Active Double Star) type networks in which an active element RT (Remote Terminal) for multiplexing and separating signals and transforming signals electrically and optically is installed between a common carrier and users so that the common carrier and the RT are connected by an optical fiber, and the RT and users are connected by a metal cable with a one-to-one correspondence; and (3) PDS (Passive Double Star) type networks (global standard name PON: Passive Optical Network) in which a light splitter SC (Star Coupler) is installed between a common carrier and users, a light signal from the station is branched in the SC, and optical fibers are installed between the SC and the users.

The PON type networks are lower in fiber installation cost than the SS type networks in which all users and the station are connected with each other by an optical fiber with a one-to-one correspondence. Also, the SC for branching light is a highly reliable passive element and requires no electrical supply, therefore not requiring a power facility and provision for power failure. For these reasons, the PON type networks are very promising technology for achieving FTTH.

Referring to FIG. 1, a description is made of BPON (Broadband optical access systems based on Passive Optical Network), which is PON using ATM (Asynchronous Transfer Mode). The BPON comprises an optical line termination (OLT) 10, optical network units (ONU) 12, and an optical star coupler (SC) 11 (hereinafter, a PON configuration including OLT, SC, and ONU will be referred to as a PON system). The OLT 10, which is primarily installed in a building or the like of a common carrier, makes authorization and bandwidth management for the ONUs 12 in the PON system. The ONUs 12 terminating a user network transform user packets received from users to ATM cells and output as many ATM cells as specified time slots at a timing specified by the OLT 10. The SC 11, which is a passive element constructed of an optical fiber, branches an optical fiber 16 of the OLT side to plural optical fibers 17-1, 17-2, ..., and 17-n of the ONU side. User data sent from the OLT 10 are sent to all ONUs via the SC 11. The SC 11 multiplexes upstream user packets delivered from the ONUs 12 and outputs the multiplexed packets to the OLT 10. Time slot assignment to the ONUs is made by an OpS (Operation System) 14 connected to the OLT 10. The interface between the OpS 14 and the OLT 10 is defined by ITU-TQ.834.1. Here, the direction from the OLT to the ONUs is defined as downstream. The direction from the ONUs to the OLT is defined as upstream.

FIG. 4 shows a frame format in BPON. FIG. 4 shows, beginning at the top, a downstream frame format, an upstream frame format, and an enlarged portion of the upstream frame format. The OLT 10 sends 224 downstream ATM cells to the ONUs in one cycle, and sends a PLOAM (physical layer OAM) cell 241 to the ONUs 12 every 27 cells for the purpose of system control and the setting of upstream bandwidths. The ONUs 12 monitor connection identifiers VPI/VCI contained in cell headers of ATM cells 252 received from the OLT 10, get only cells directed to the pertinent ONUs 12, and send user data to physical lines 18 of the user side. The ONUs 12 transform user packets received from users 13 to ATM cells, append a header PON-OH (PON-OverHead) 251 to the leading portion of the ATM cells, and output the ATM cells to the OLT 10. The timing in which the ONUs 12 output the cells and the number of time slots are set in the system control cell PLOAM 241 sent from the OLT 10 and thereby specified to the ONUs by the OLT. Upstream cells sent to the OLT from the ONUs are multiplexed (e.g., time division multiplexing) on an identical optical fiber of the OLT side in the SC. To prevent cells sent from the ONUs from conflicting with each other in the SC, the OLT uses the PLOAM cell to make output timing adjustment called ranging and set timing in the ONUs. The OLT assigns time slots to the ONUs. In other words, time slot assignment in consideration of users under the ONUs is not performed.

A transfer method of a BPON system is defined by ITU-T G.983.1 and G.983.2. For EPON (Ethernet-PON) systems that perform a transfer between OLT and ONUs over Ethernet, IEEE 802.3ah is pushing ahead with standardization of transfer methods.

FIG. 6 shows a network configuration that allows users to connect to the Internet 30 in FTTH. This network comprises a broadband access server BAS 28 that performs aggregation of user accesses, user management, and service allocation; an OLT 10 that receives user data from the BAS and sends it to a PON system, and manages the PON system; SC 11 that branches a single optical fiber to plural optical fibers; and ONUs 12 that terminate user access and send user data to the PON system (OLT) according to the OLT. Users 13 are authorized in the BAS via the ONUs 12 and the OLT 10 before being connected to the Internet. In this configuration, the PON system is used as a communication path for connecting the ONUs installed within user premises and the BAS, wherein a bandwidth has been allocated to the communication path.

In BPON and EPON systems, a path between ONUs and OLT is used as a data path to which a bandwidth has been allocated, and bandwidth control between OLT and ONUs is performed in an ONU unit. As more and more users introduce FTTH, a PON system suffers from the problem of the number of branches of SC. Since one ONU is normally installed for each user, an optical fiber of one branch is required for one user. To accommodate more users in an identical PON system, the SC must be adapted to have more branches. The number of branches of the SC is limited by physical constraints attributed to laser output installed in both the OLT and ONU. Multiple branches are achieved only by use of very expensive and high-output lasers. Accordingly, one method for avoiding the limitation on the number of branches is to accommodate plural users in an ONU and share the ONU among the users. However, since the OLT and the BAS operate independently, in the prior art, the OLT has not performed bandwidth control for each of users under the ONUs.

SUMMARY OF THE INVENTION

The present invention aims at performing bandwidth control on a user basis between OLT and ONUs.

To achieve the above object, the present invention performs bandwidth control under cooperation between the BAS and OLT. Bandwidth information allocated to each user is registered in advance in a RADIUS server and used for bandwidth setting during user authorization. The BAS uses a user profile obtained during the authorization to perform bandwidth control of the PON system. PPP is used for authorization between users and the BAS, and bandwidth control is achieved by passing bandwidth information of each user obtained from the RADIUS server to the OLT. The OLT uses session ID of PPPoE to identify user data. This is created when a session between the BAS and a user is established. User packets are buffered and shaped every session ID to achieve bandwidth control on a user basis.

BRIEF DESCRIPTION OF THE DRAWINGS

FIG. 11 is a diagram showing an ONU bandwidth control table provided in FIG. 10;

FIG. 27 is a diagram showing an example of the setting of user attributes set in a RADIUS server.

DESCRIPTION OF THE PREFERRED EMBODIMENTS

Hereinafter, embodiments of the present invention will be described with reference to the accompanying drawings.

Figure 8:
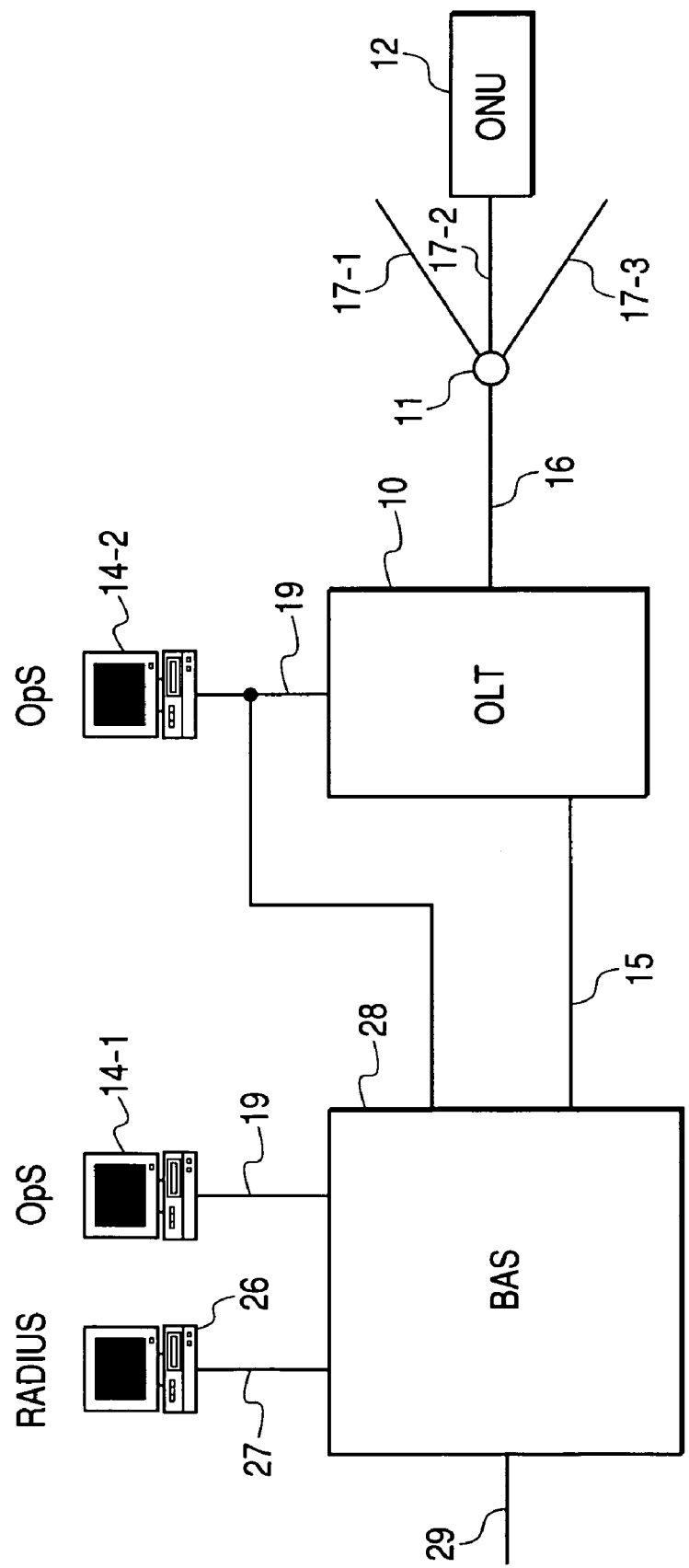
FIG. 8 is a diagram showing a network configuration in which BAS and OLT operate in cooperation and the BAS performs system control through a separate line.

FIG. 8 shows a network configuration in which BAS and OLT operate in cooperation and the BAS performs system control through a separate line. The network system in FIG. 8 comprises BAS 28, OLT 10, and ONU 12, wherein the BAS and the OLT operate in cooperation in such a way that the BAS, during user authorization, passes user bandwidth information obtained from a RADIUS server to the OLT to perform bandwidth control on a user basis under the ONU.

Figure 9:
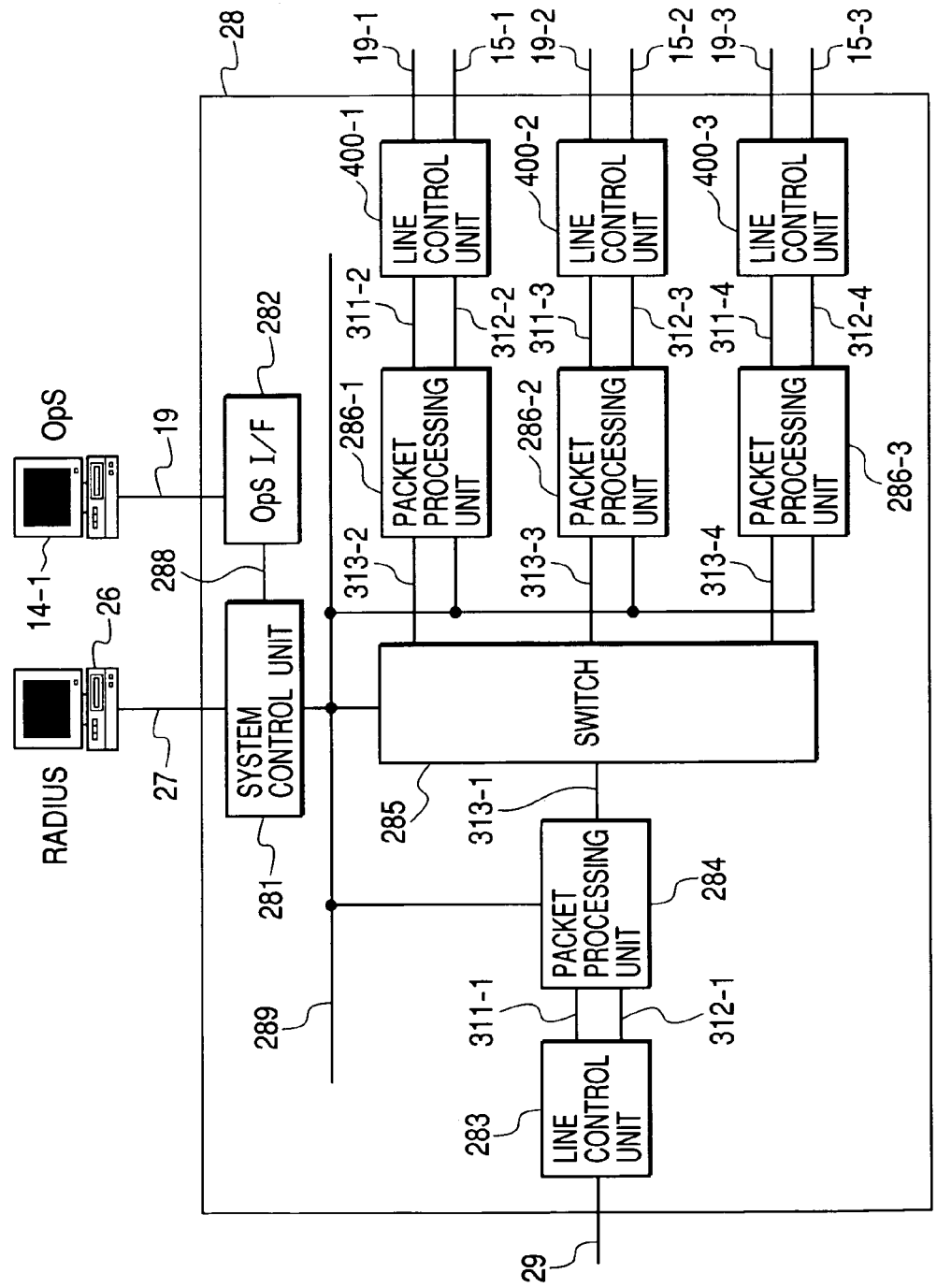
FIG. 9 is a diagram showing the configuration of the BAS in FIG. 8.

FIG. 9 is a functional block diagram of the BAS used in FIG. 8. The BAS comprises: an input side line control unit 283; output side line control units 400; an input side packet processing unit 284; output side packet processing units 286; a switch 285; a system control unit 281; and an OpS interface 282 used for control from a management terminal. Upon receipt of a packet from the outside, the input side line control unit 283 performs physical layer processing and transfers the packet to the packet processing unit 284. The input side packet processing unit 284 performs protocol processing such as PPP termination and transfer in the IP layer for the packet received from the line control unit 283, and transfers the packet to the switch 285. The switch 285 performs switching to a path decided in the packet processing unit 284 and outputs the packet to a corresponding output side packet processing unit 286. The output side packet processing unit 286 performs protocol processing such as L2TP of layers 2 and 3 to match an output side line, and outputs the packet to the line control unit 400. The line control unit 400 performs physical layer processing and outputs the packet to the OLT 10. The BAS in FIG. 7 is different from that in FIG. 6 in that an interface for OLT control is added to the line control unit.

Figure 1:
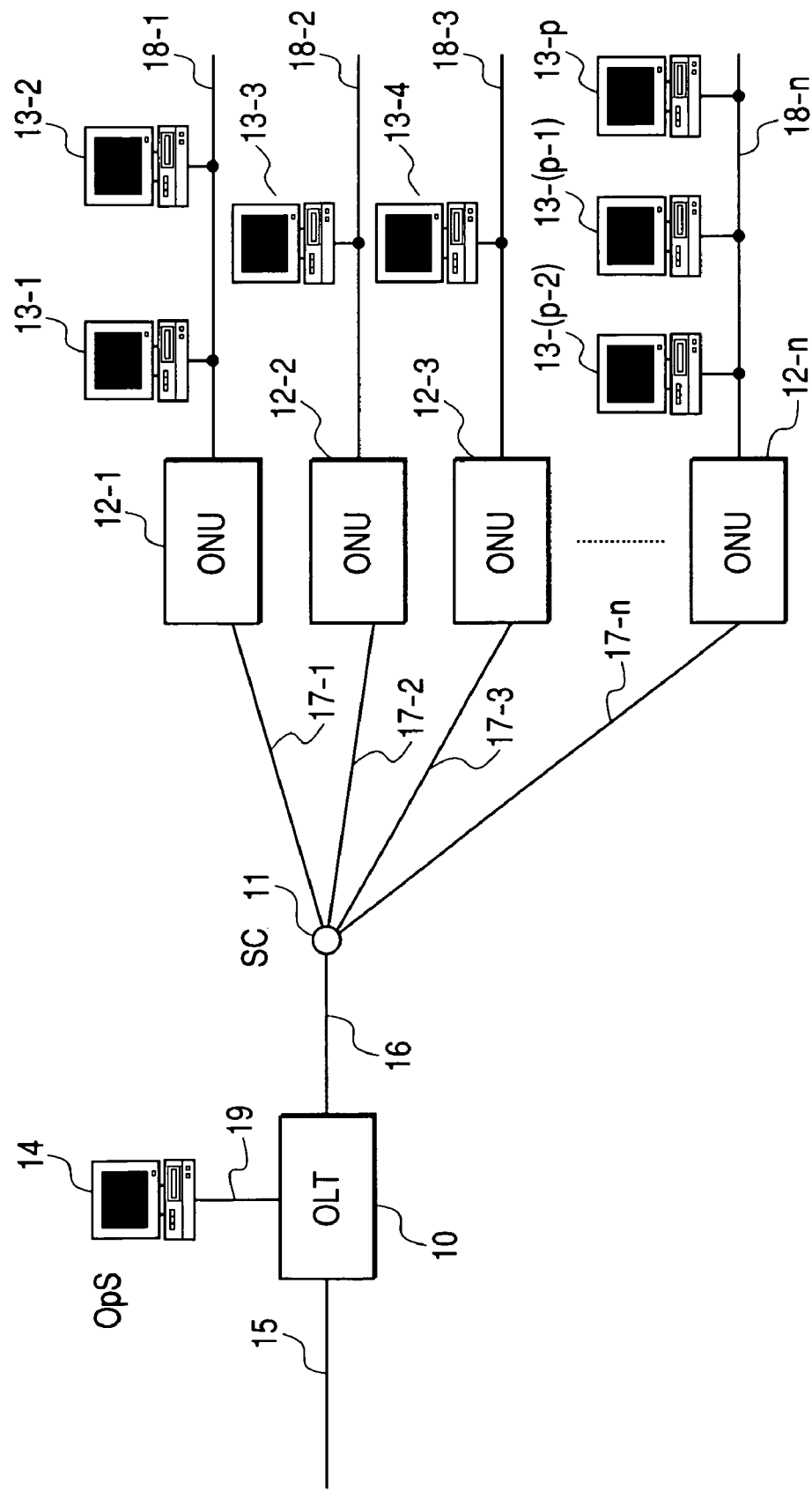
FIG. 1 is a diagram showing a network configuration of a general PON system of the prior art.
Figure 2:
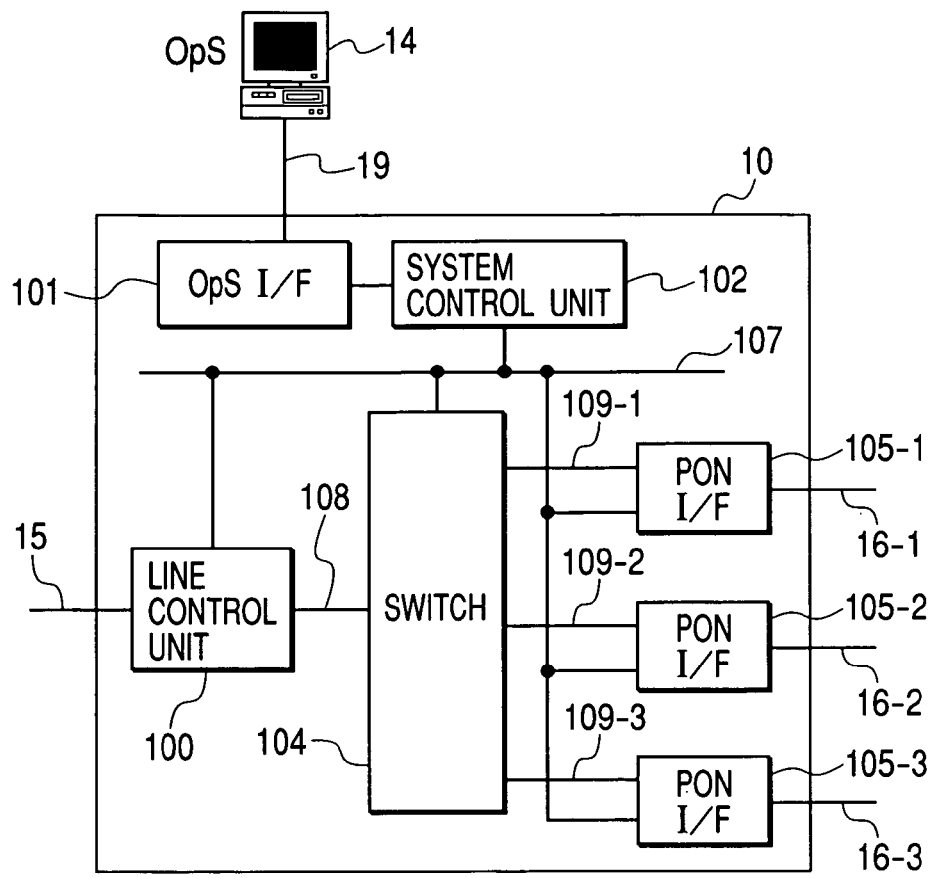
FIG. 2 is a diagram showing the configuration of OLT used in FIG. 1.

FIG. 2 is a functional block diagram of the OLT used in FIG. 8. The OLT comprises: a line control unit 100; a switch 104; PON interfaces 105; a system control unit 102; and an OpS interface 101. Data received from the BAS 28 is outputted to the switch 104 after the line control unit 100 terminates the physical layer and decides a path. The switch 104 outputs the packet to a PON interface 105 corresponding to a path decided by the line control unit 100. The PON interface 105 performs PON system management such as bandwidth setting between OLT 10 and ONUs 12, output timing management, and authorization between OLT 10 and ONUs 12, and sends and receives data to and from the ONUs 12. Management information of the PON system is set in the PON interfaces 105 from an external terminal through the OpS interface 19. The PON interfaces 105 use the setting information to control downstream bandwidth from the OLT 10 and control upstream bandwidth to the OLT 10 from the ONUs 12 by sending a management packet to the ONUs 12. Upon receipt of the packet from the output side packet processing unit, the PON interface 105 buffers it in an ONU 12 of an output destination and outputs data to the optical fiber 16 with a bandwidth allocated to the ONU 12.

Figure 3:
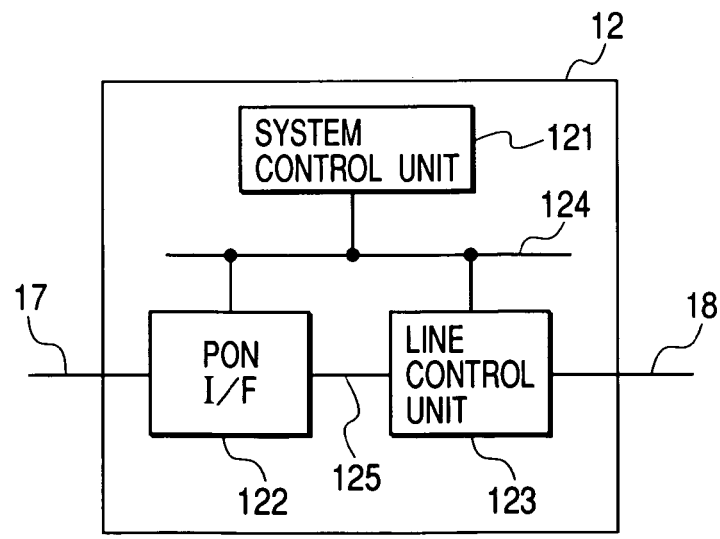
FIG. 3 is a diagram showing the configuration of ONU used in FIG. 1.
Figure 4:
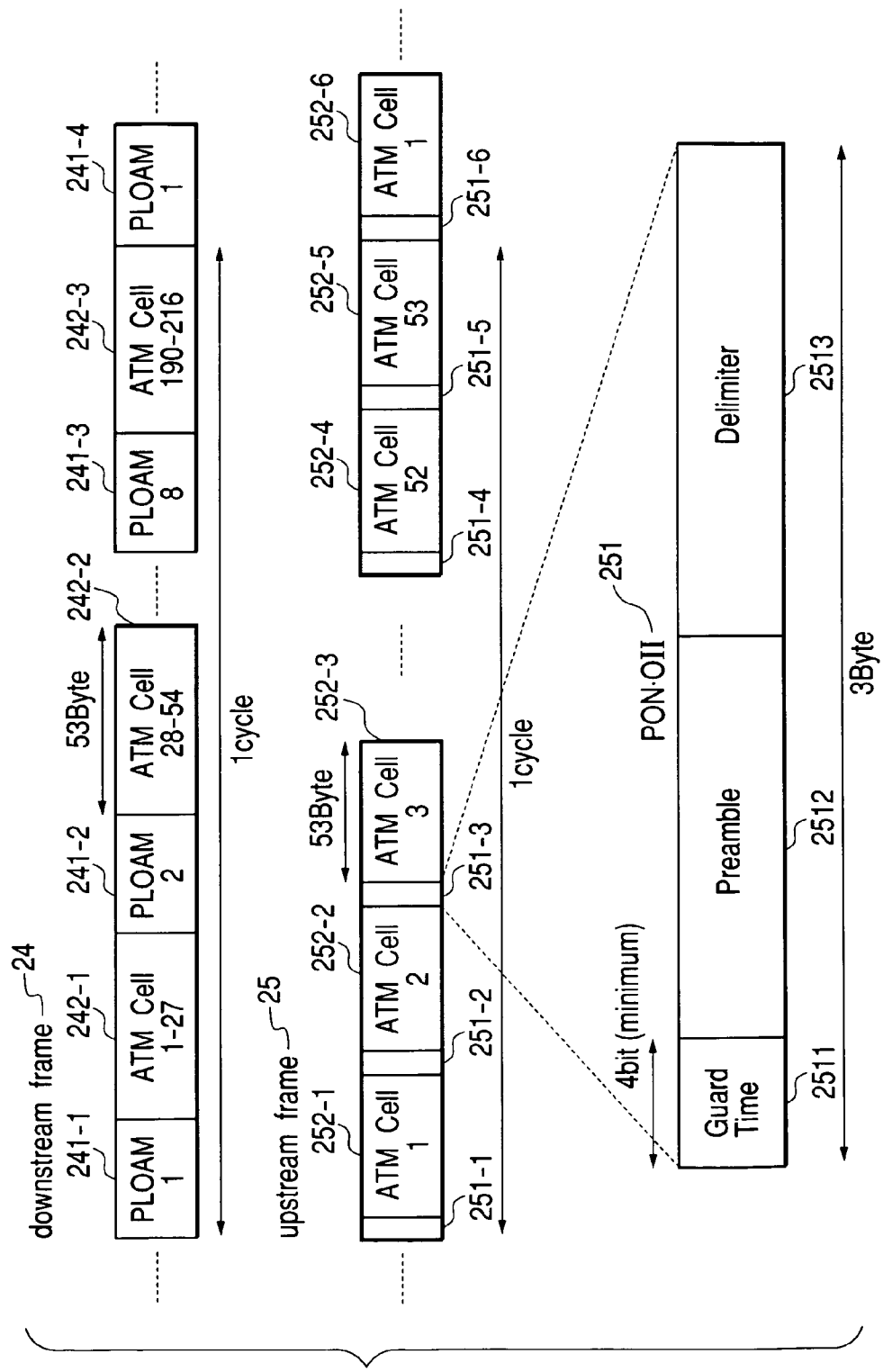
FIG. 4 is a diagram showing upstream and downstream frame formats in BPON of the prior art.

FIG. 3 is a functional block diagram of the ONU used in FIG. 8. The ONU comprises: a system control unit 121; a PON interface 122; and a line control unit 123. The PON interface 122 extracts only packet directed to that ONU from data sent from the OLT 10 and transfers the packet to the line control unit. Also, the PON interface 122 performs upstream bandwidth control and sending timing control on the basis of control information sent from the OLT 10.

Figure 6:
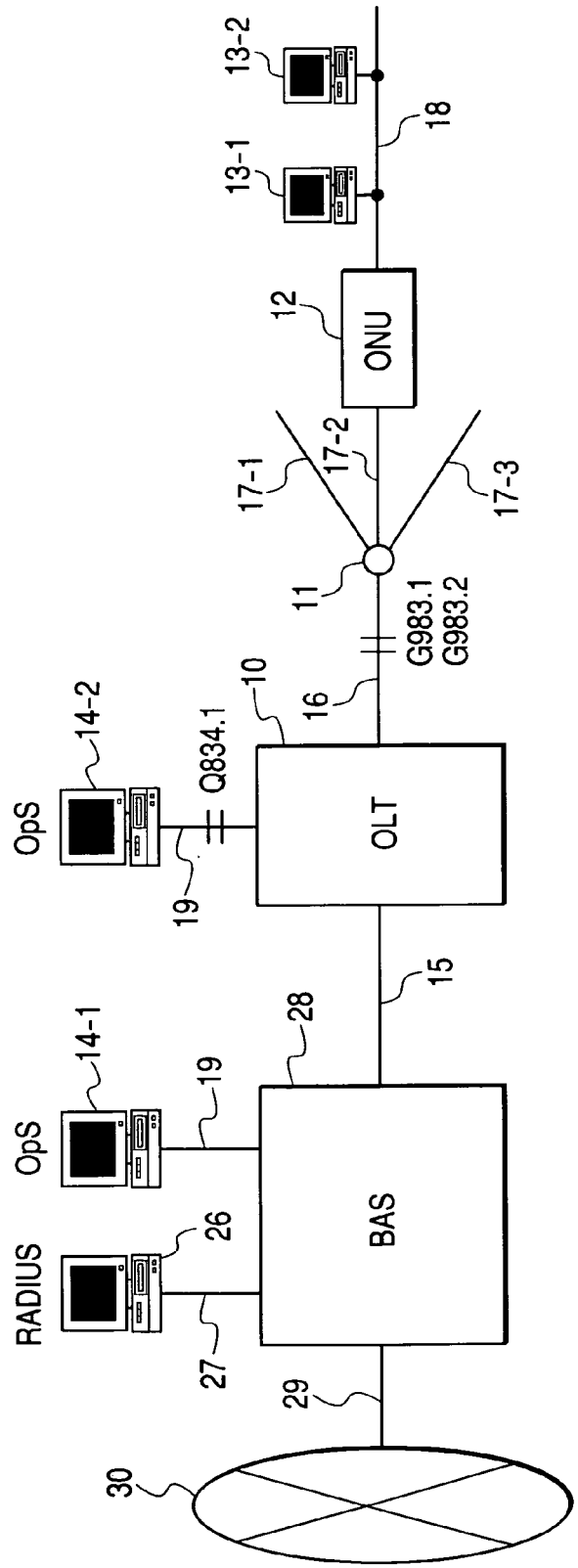
FIG. 6 is a diagram showing the configuration of a network in which the general PON in FIG. 1 and BAS are connected.
Figure 7:
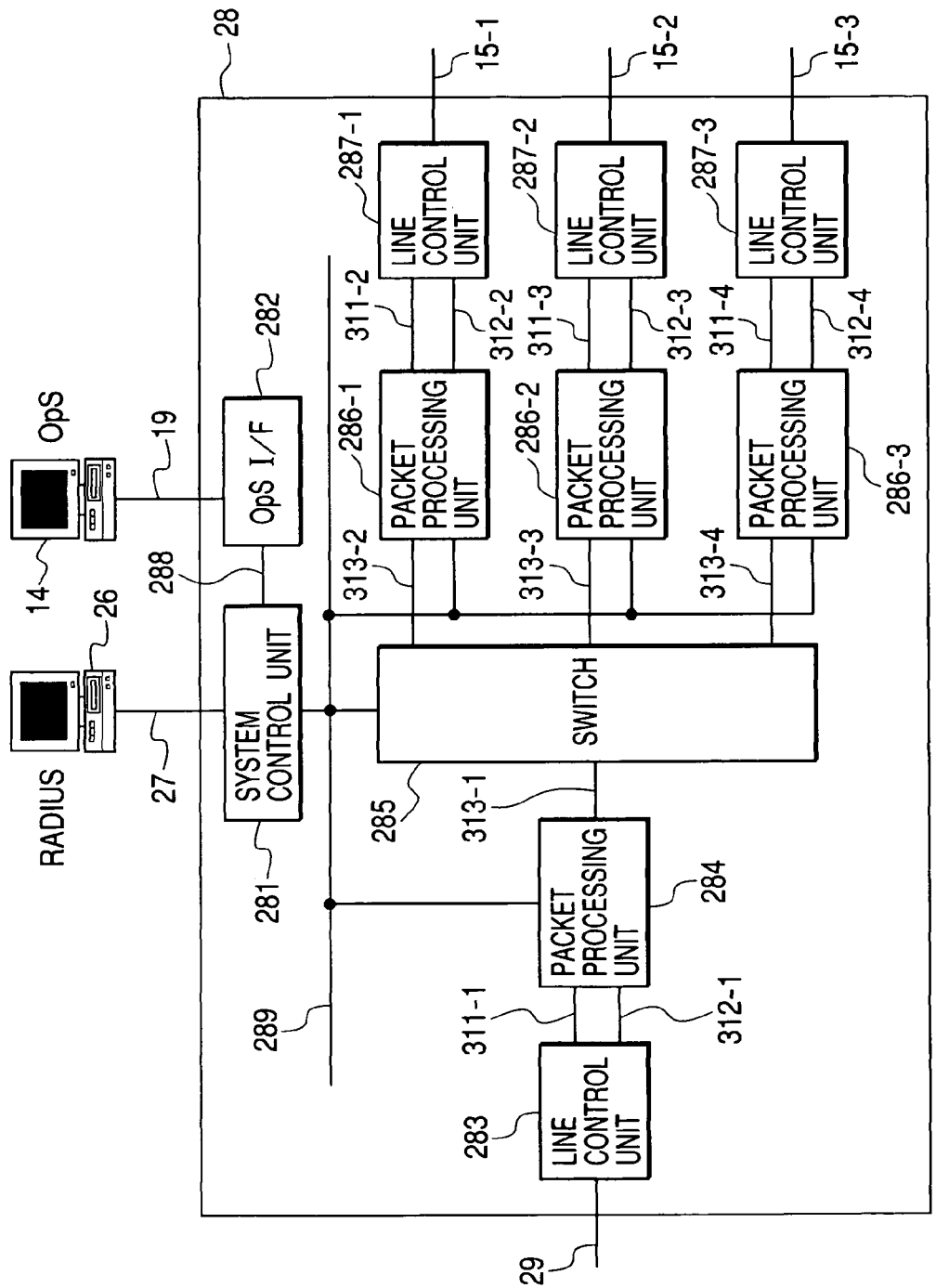
FIG. 7 is a diagram showing the configuration of the BAS used in FIG. 6.

In the network configuration shown in FIG. 6, the PON operates independently of the BAS 18 and is used as a data path for connecting the BAS 18 and a user network 13 under the ONU, wherein a bandwidth is allocated to the data path. Bandwidths between the OLT 10 and ONU 12 are set in an ONU basis by OpS 14-1 of the OLT 10.

In this embodiment, the BAS and OLT operate in cooperation, and bandwidth control is achieved on a user basis by reflecting user information obtained by BAS user authorization in the OLT. Hereinafter, an embodiment of EPON will be described.

Figure 5:
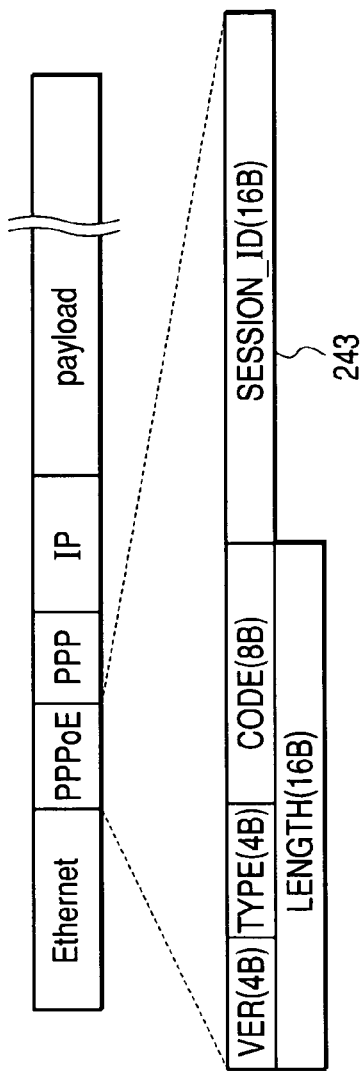
FIG. 5 is a diagram showing a PPPoE frame format.

In this embodiment, PPP is used for user authorization and Ethernet is used for physical lines for connecting the ONUs and user terminals. User interfaces are not limited to Ethernet. In cases where physical lines are Ethernet, packets are transferred over PPPoE. The PPPoE is defined in RFC2516 and its packet format is as shown in FIG. 5. In this embodiment, the OLT has a bridge function and the ONUs have a router function. That is, the PON interface 122 of the ONUs, which has MAC addresses, changes a sender MAC address specified by a user to a MAC address of the PON interface and a destination MAC address to a MAC address of the line control unit 287 of the BAS and sends them to the BAS. The OLT sends MAC addresses of the ONUs to the BAS without modification. The OLT or ONU can include either of the bridge function and the router function. The ONUs monitor destination MAC addresses of packets outputted by the OLT and capture packets directed to the pertinent ONUs. The BAS consults the RADIUS (Remote Authorization Dial-In User Service) server 26 about user information during user authorization, and obtains authorization and user information for user's network settings. Since RFC2138 defining the RADIUS server is not supposed to be used in PON, attributes for parameters used for PON bandwidth control are not defined. Accordingly, bandwidth information is stored in vendor specific attributes permitted for free use by equipment vendors. It is also possible to include desired parameters in IDs with specific attributes not assigned.

FIG. 27 shows examples of attributes registered in the RADIUS server. Thereby, the BAS can obtain user bandwidth information during user authorization.

Figure 15:
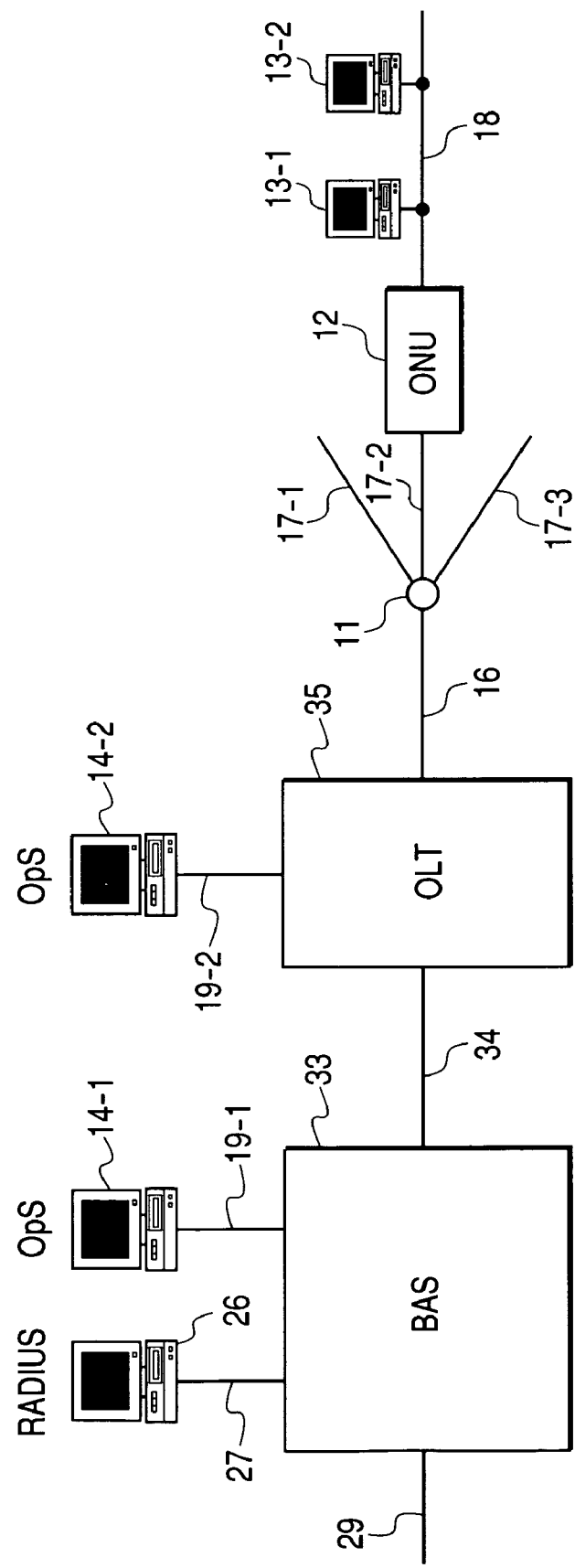
FIG. 15 is a diagram showing a network configuration in which BAS issues OLT control packets by in-channel communication, in OLT bandwidth control from BAS under cooperation between the BAS and OLT.
Figure 18:
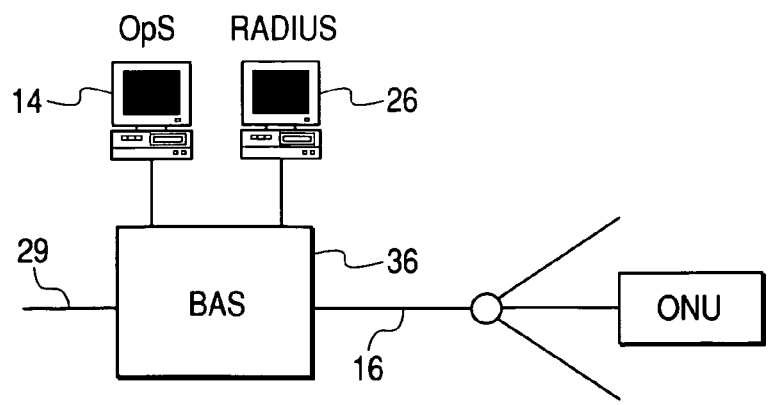
FIG. 18 is a diagram showing a network configuration in which OLT is accommodated in BAS as a line interface and used integrally with the BAS.

The BAS performs bandwidth control for the OLT in three ways: first, as shown in FIG. 8, the BAS performs bandwidth control through a system control interface of the OLT; second, as shown in FIG. 15, the BAS sends control packets to the OLT through a line interface for sending user packets (hereinafter referred to as in-channel communication) to achieve OLT control; and last, as shown in FIG. 18, the BAS gets the OLT as a line interface of the BAS to directly control the OLT.

Two methods are available to control bandwidths: one method is to change bandwidths allocated to ONUs according to the number of accommodated users and user bandwidths; and another method is to control bandwidths between the OLT and ONUs on a user basis. The two bandwidth control methods will be described using the drawings for each of system configurations.

Figure 14:
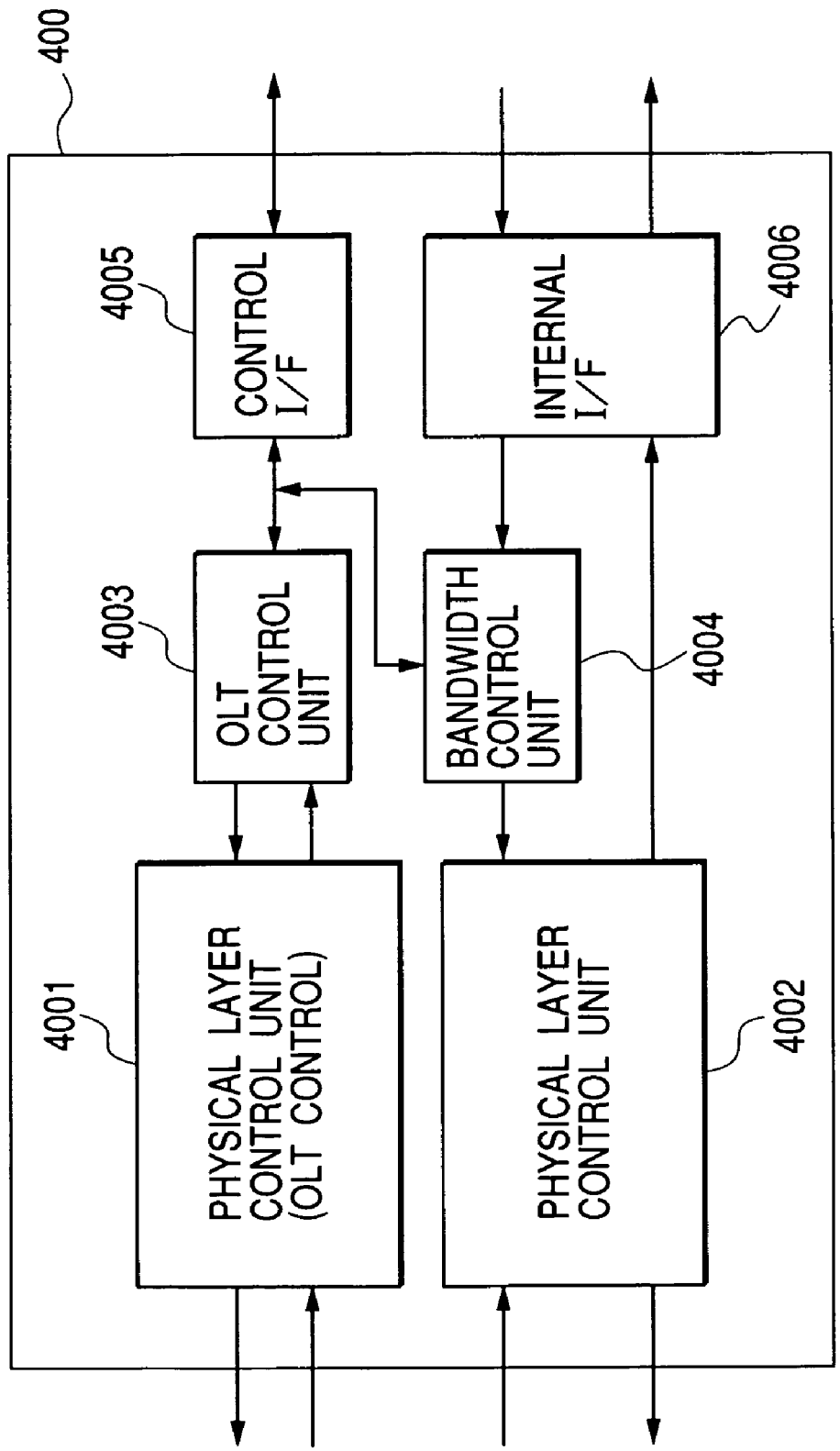
FIG. 14 is a diagram showing the configuration of a line control unit having an interface conforming to Q.983.1 for OLT control in the method of FIG. 8 for performing bandwidth control by a special line from BAS under cooperation between the BAS and OLT.

Referring to FIG. 8, a description is made of a configuration in which downstream bandwidths from the BAS to the OLT are controlled using a system management interface of the OLT. Protocols required for system control between the OpS and OLT are defined in ITU-T Q.834.1, and Q3, SNMP (Simple Network Management Program), and CORBA can be used as interfaces of the OLT. In order that OLT system control is achieved in the line control unit of the BAS, the line control unit is configured to have an OLT control interface as shown in FIG. 14. The line control unit comprises: a physical layer control unit 4001 that physically terminates user data; a physical layer control unit 4002 that physically terminates control data; an OLT control unit 4003 that creates packets for controlling the OLT; a control interface 4005 that receives control signals from the packet processing unit 286 and sends them to the OLT control unit 4003 and a bandwidth control unit 4004; the bandwidth control unit 4004 that controls downstream bandwidths; and a packet processing unit interface through which user data is sent and received to and from the packet processing unit.

A description is made of a method of changing bandwidths allocated to ONUs according to the number of users and bandwidths in the configuration of FIG. 8. Although this method performs bandwidth control on an ONU basis like conventional methods, bandwidths for ONUs are changed according to the number of users and allocated bandwidths.

Figure 22:
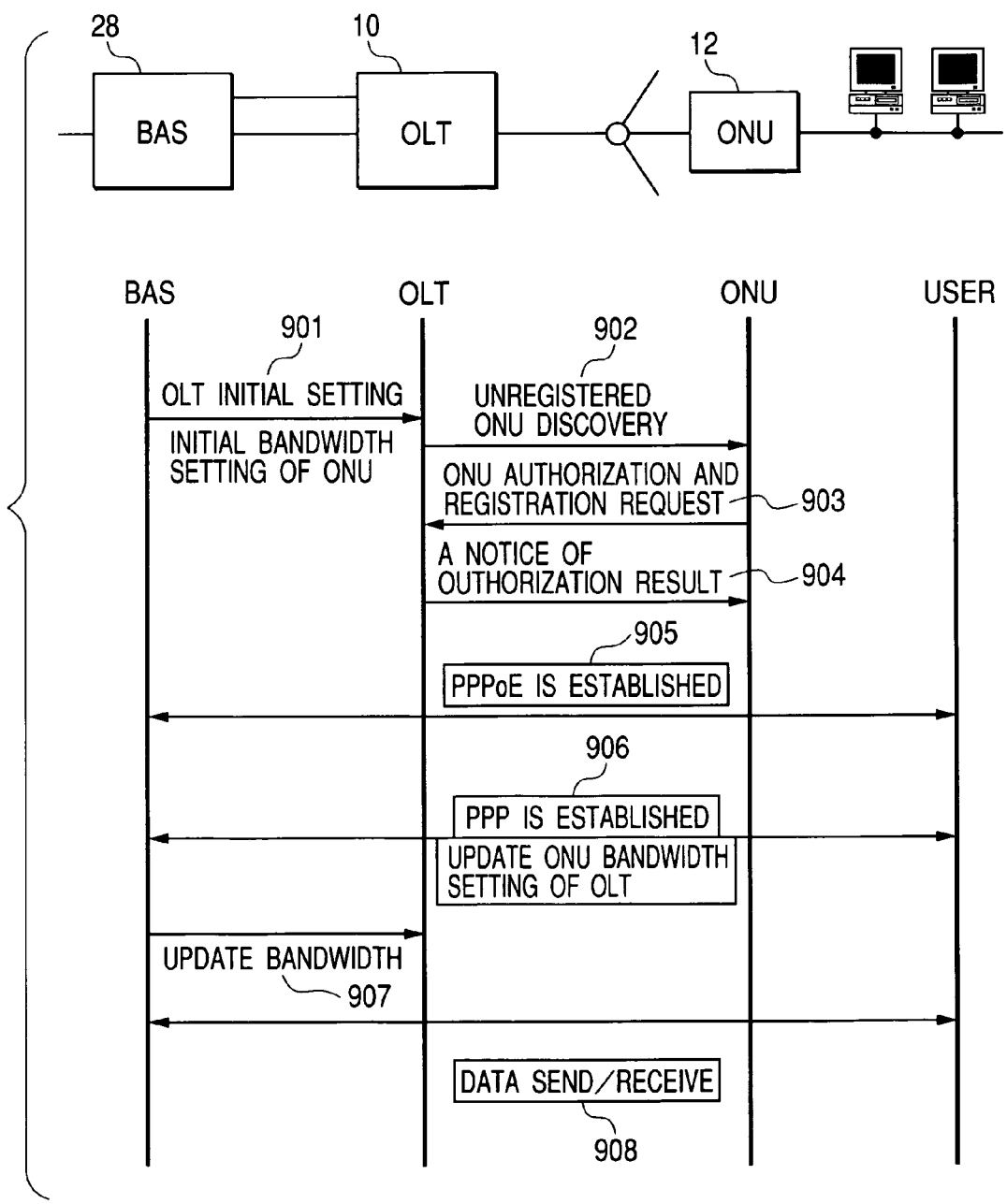
FIG. 22 is a diagram showing bandwidth allocation sequences among BAS, OLT, and ONU in a method of controlling bandwidths allocated to ONUs according to the number of users accommodated under the ONUs and user bandwidths.

FIG. 22 shows control sequences among BAS, OLT, ONU, and users. The BAS 28 starts the OLT 10 and then performs initial setting for the OLT 10 (901). The BAS 28, during the initial setting (901), allocates bandwidths to individual ONUs 12 in advance to process control signals. Next, the OLT discovers unregistered ONUs (902). In response, the ONUs 12 send a registration request to the OLT 10. The OLT 10 receives the registration request from the ONUs 12 and makes authorization (903). If the authorization is correctly made, the OLT 10 permits use of a control bandwidth allocated to the ONUs 12 during the initial setting and notifies the ONUs 12 of the fact (904). If the ONUs 12 are authorized in the OLT 10, the user sends an authorization request packet for establishing PPPoE to the BAS 28 using the control bandwidth permitted in the sequence 904. If PPPoE is correctly established, the user establishes PPP (906). Upon receipt of the user authorization request packet during PPP establishment, the BAS 28 makes a request to the RADIUS server 26 for user information and judges whether to authorize the user. If authorization information is correct, the BAS 28 obtains bandwidth information allocated to the user from the user information and sums the bandwidths of accommodated users for each of the ONUs 12, and then sets bandwidth information of each ONU 12 to the OLT 10 through the OpS interface 19 (907). Thereafter, authorization approval is sent to the user and user communication by use of IP is started.

Figure 23:
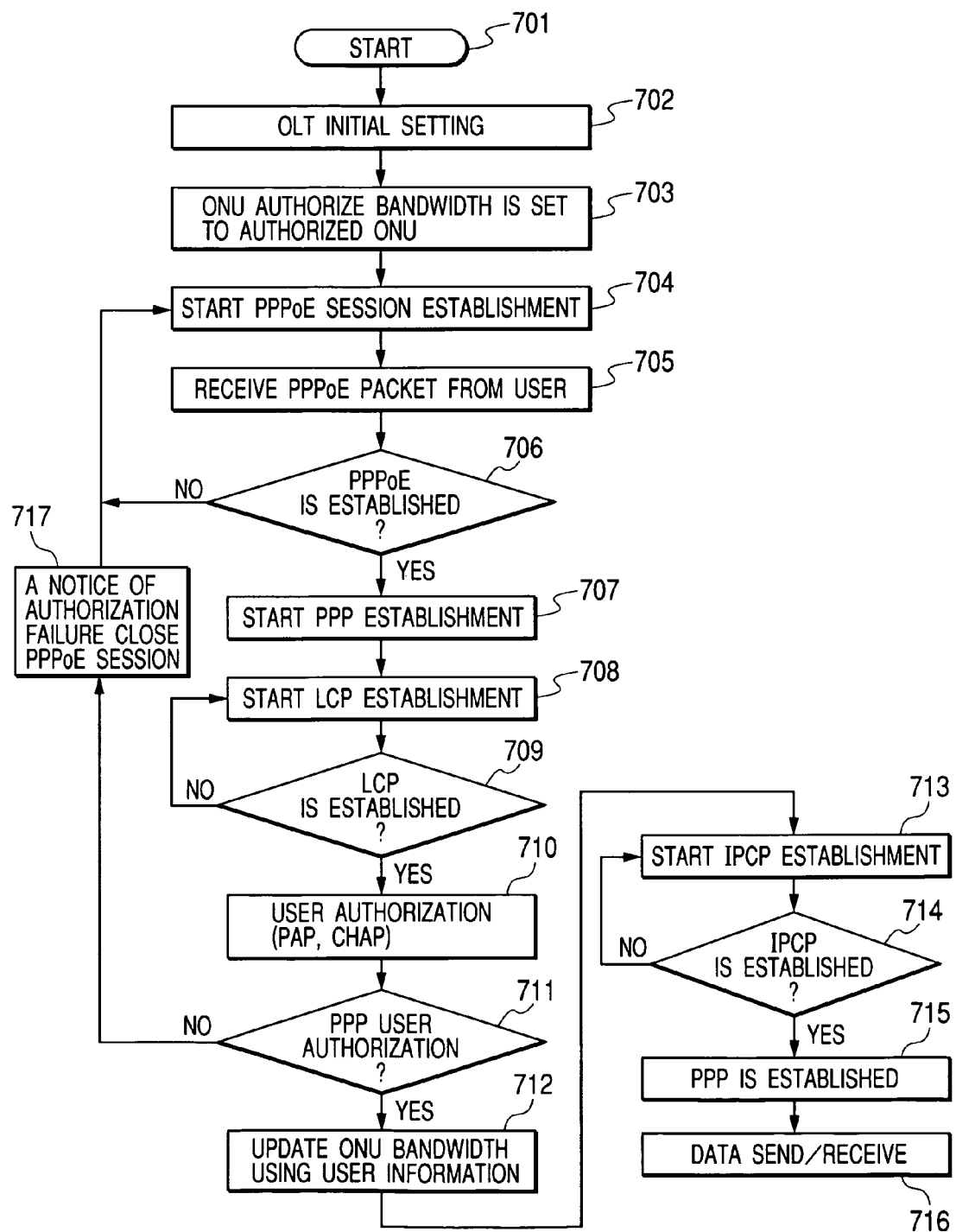
FIG. 23 is a diagram showing a flow of control by BAS in a method of controlling bandwidths allocated to ONUs according to the number of users accommodated under the ONUs and user bandwidths.

Next, referring to FIG. 23, a detailed description is made of protocol processing and settings performed between users and the BAS. The OLT 10, when started (701), performs initial settings of the ONUs (702). In the initial settings, initial bandwidth setting for the ONUs is performed. Initial bandwidths are used for control to establish PPPoE and PPP between users and the BAS; predetermined, fixed bandwidths are set as the initial bandwidths. Upon termination of the initial settings (702), the OLT discovers unregistered ONUs and performs authorization of the ONUs (703). If the authorization is correctly made, the OLT permits use of control bandwidths between OLT and ONUs set in the initial settings (702) (703).

When bandwidths between OLT and ONUs have been allocated in 703, the users 13 start PPPoE establishment between BAS 28 and users 13 and send a packet for PPPoE establishment to the BAS (705), using the control bandwidths between OLT and ONU.

When PPPoE has been correctly established between BAS 28 and users 13 (706), the users 13 start PPP establishment (707). In the PPP establishment phase, LCP establishment (708), user authorization (710), and IPCP establishment (714) are performed. These are described in order below. In the PPP establishment phase, LCP (Link Control Protocol) for negotiation of the data link layer is executed (708). If LCP is correctly set (709), user authorization is performed. PAP (Password Authentication Protocol) and CHAP (Challenge Handshake Authentication Protocol) can be used as protocols for user authorization; user authorization is performed using either of the protocols (710). If user authorization has been correctly performed (711), user bandwidths are summed on an ONU basis using user bandwidth information obtained from the RADIUS server 26 during user authorization (710), and the summation result is set in the OLT 10 as bandwidths between OLT and ONUs (712). When ONU bandwidths with users in mind have been updated (712), IPCP (Internet Protocol Control Protocol) for performing network settings such as user IP setting is established (714). If the PPP establishment phase is normally terminated, user communication by use of IP is enabled (716).

Figure 10:
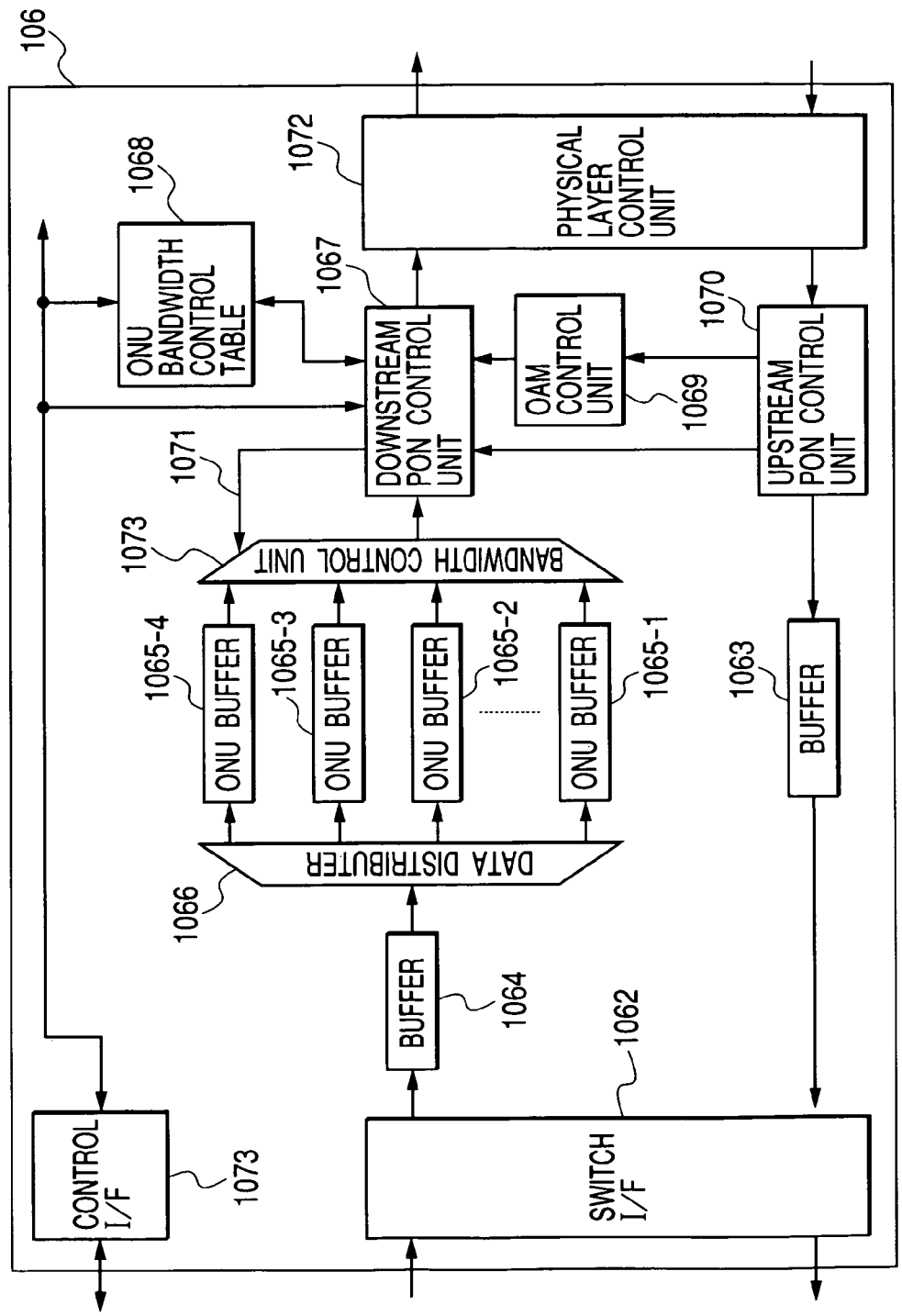
FIG. 10 is a diagram showing the configuration of a PON interface installed in OLT in a bandwidth control method on an ONU basis.

To realize this method, PON interfaces 106 configured as shown in FIG. 10 within the OLT 10 are used to buffer user packets on an ONU basis, whereby bandwidth control is performed. The PON interfaces 106 receive user packets from the BAS 28 via the line control unit 100 and the switch 104. Referring to FIG. 10, a description is made of the configuration of the PON interface 106. The PON interface 106 comprises: a switch interface 1062; buffers 1063, 1064; a data distributor 1066; a bandwidth control unit 1073; a user buffer 1065; a downstream PON control unit 1067; an upstream PON control unit 1070; an OAM control unit 1069; a physical layer processing unit 1072; a control interface 1061; and a user bandwidth control table 1068. The PON interfaces 106 receive data in a switch interface 1062 and buffer user packets in a buffer 1064. A data distributor 1066 distributes the buffered user packets to ONU buffers 1065 on an ONU basis. A downstream PON control unit 1067 schedules data reading on the basis of bandwidth information of each ONU of an ONU bandwidth control table 1068 as shown in FIG. 11, and performs reading from a bandwidth control unit so as to satisfy a bandwidth specified for each ONU. The bandwidth control unit 1073 outputs packets of a byte count specified by an ONU specified in the downstream PON control unit 1067. To avoid fragment processing, setting is made to read data every 1500 bytes so that the data is read in a packet unit, and sending from the ONU buffer is terminated when the number of remaining sendable bytes becomes less than 1500 bytes.

A description is made of a method of controlling bandwidths between OLT and ONUs on a user basis in the configuration of FIG. 8. In this method, the BAS uses user bandwidth information obtained during user authorization to set user bandwidths in the OLT, and the OLT outputs user data on the basis of set user bandwidth information.

In this embodiment, the OLT uses PPPoE session ID 243 as a means for identifying user packets. A session ID, which is decided for each of PPPoE sessions, is used by the OLT as key for searching the user control table used to achieve downstream user bandwidth setting.

Figure 24:
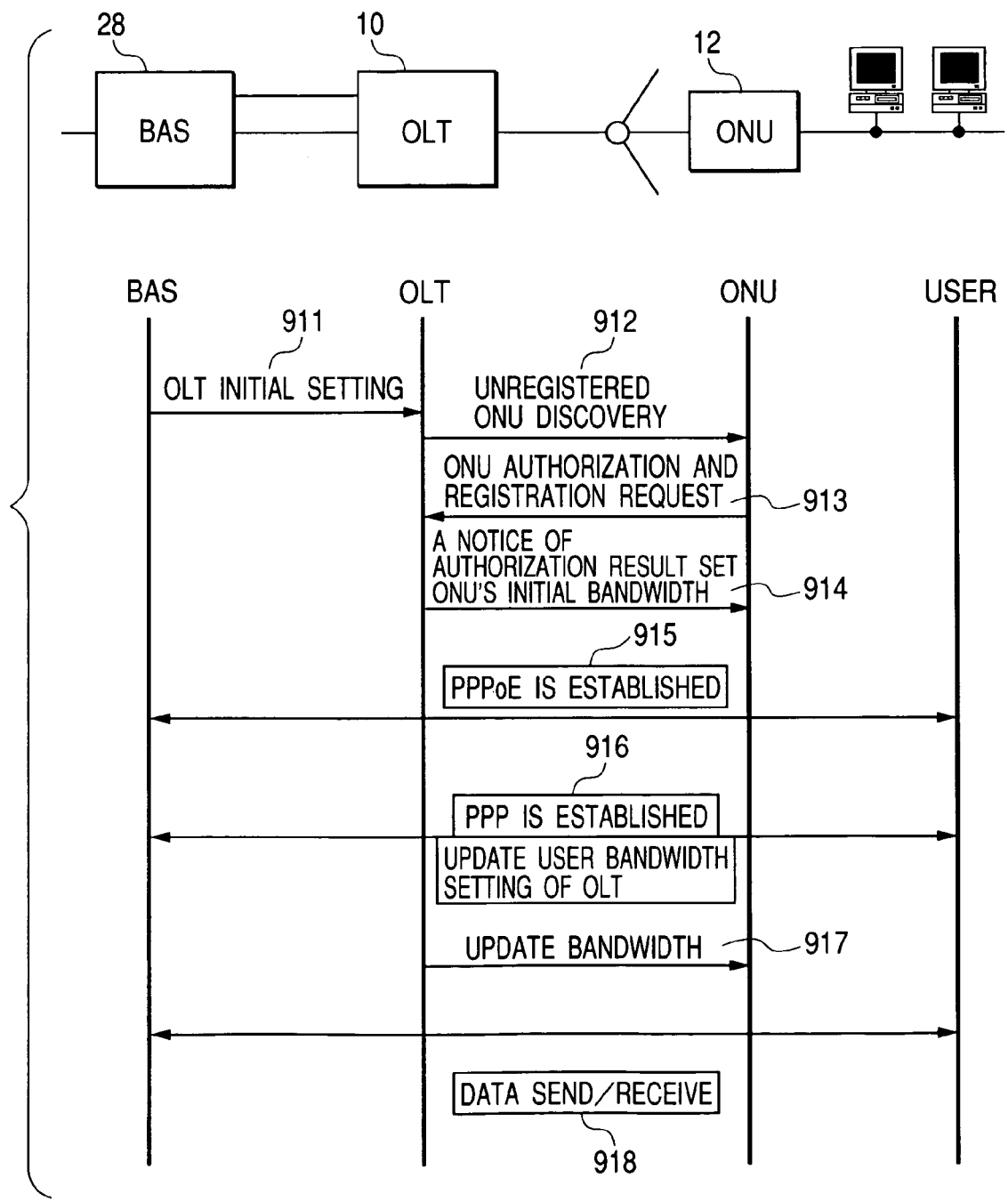
FIG. 24 is a diagram showing system control sequences among BAS, OLT, and ONU in a method of performing bandwidth control for each of users accommodated under ONUs.
Figure 25:
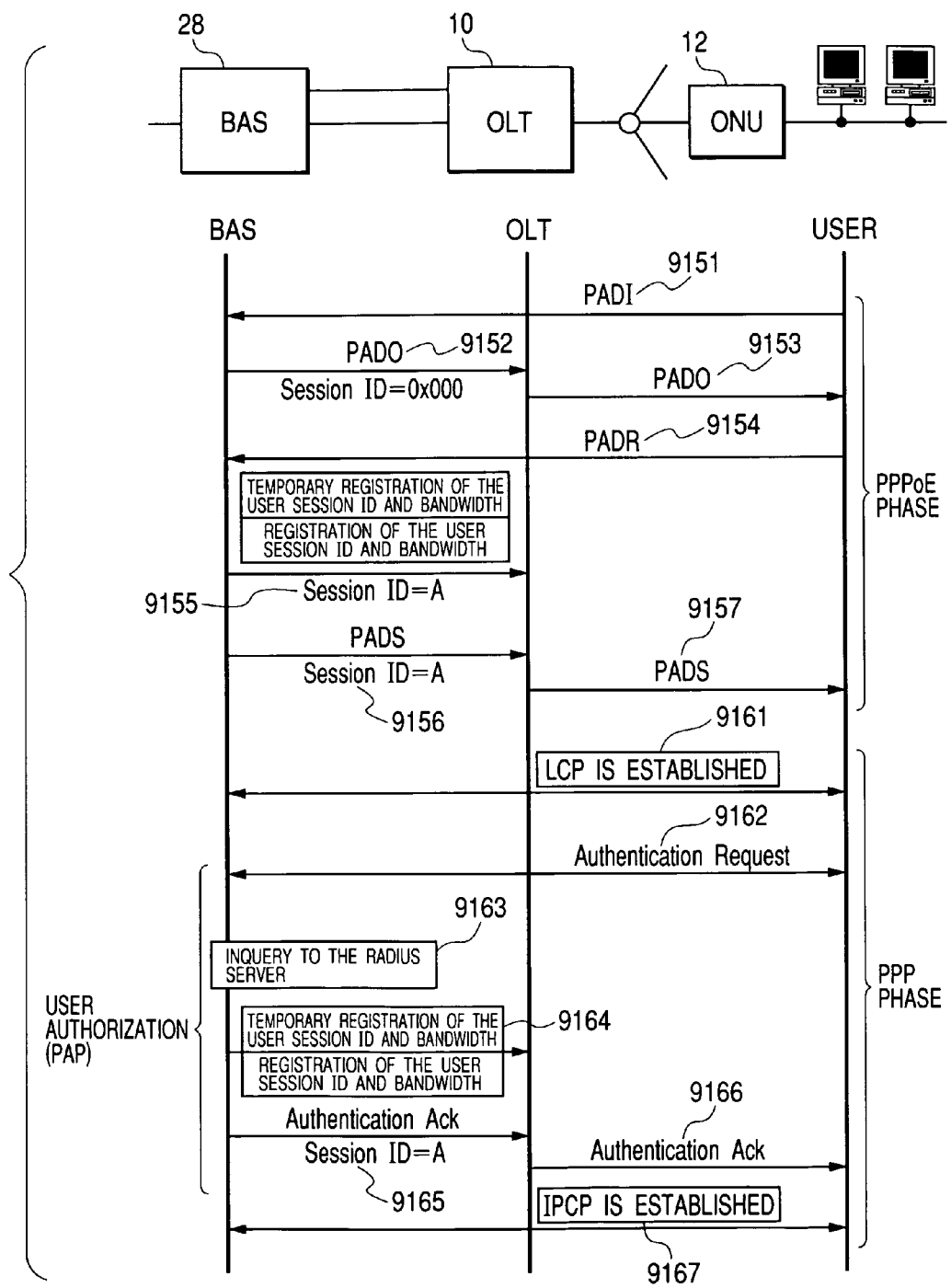
FIG. 25 is a diagram showing PPPoE and PPP sequences exchanged among BAS, OLT, and users in FIG. 24.

Referring to FIG. 24, a description is made of control performed among BAS, OLT, ONU, and users. Ops of the BAS 28 or OLT 10, after the OLT 10 is started, performs initial setting for the OLT (911). Conventional PON systems set bandwidths at the same time when initial setting is performed for the OLT. On the other hand, in this embodiment, since downstream bandwidths are set based on user information obtained in the BAS, when ONUs are registered, no downstream bandwidths are set and only upstream bandwidths are set. When the OLT initial setting terminates (911), the OLT 10 discovers unregistered ONUs (912). In response, the ONUs 12 send an authorization request to the OLT (913). Upon termination of ONU authorization, the users make PPPoE and PPP establishment with the BAS 28. Referring to FIG. 25, a description is made of PPPoE and PPP establishment procedures and a downstream bandwidth setting procedure by the users.

In the PPPoE session 915, PADI (PPPoE Active Discovery Initiation) for discovery of BAS to authorize users is sent from the users (9151). In response, the BAS 28 outputs PADO (PPPoE Active Discovery Offer) of session ID number 0 (9152). Bandwidth control in the OLT is performed on a session ID basis. Since the session ID number 0 is primarily used for control sequences between users and BAS, a bandwidth used for control is allocated in advance. The first packet PADO (9153) to be sent to the users 13 from the BAS 28 is also outputted to the ONUs, using the bandwidth (9153). Thereafter, the PADO is read from a user buffer according to the bandwidth control table in the downstream PON control unit 1067, and outputted to the ONUs 12. The ONUs 12 monitor a destination MAC address of the sent Ethernet frame, receive a frame directed to the pertinent ONU, and send the frame to a network 18 under the ONU. The users 13 receiving the PADO 9152 output PADR (PPPoE Active Discovery) (9154) and make a request to the BAS 28 for a session ID for session establishment. Upon receipt of it, the BAS 28 issues a PPPoE session ID, registers it in the OLT, and temporarily registers a predetermined control bandwidth (9155). Then, the BAS 28 outputs PADS (PPPoE Active Discovery Session Confirmation) for assigning a PPPoE session ID to the users 13, using a session ID uniquely assigned to a user session to the OLT(9156). Upon receipt of the PADS from BAS, the OLT checks the session ID, outputs the PADS to the ONUs in the bandwidth for control set by the BAS (9157), and completes PPPoE establishment. The users recognize the session ID assigned to them by receiving the PADS (9157), and use the session ID from the next output to perform communications. Since the session ID corresponding to the users 13 has been registered in the OLT 10, subsequent communications between the BAS and the users can be performed using the session ID. The completion of PPPoE establishment is followed by PPP establishment (916). In PPP, first, LCP (Link Control Protocol) is executed (9161) and negotiation of the data link layer is conducted. Next, user authorization is conducted. Although, in PPP, PAP (Password Authentication Protocol) and CHAP (Challenge Handshake Authentication Protocol) can be used as user authentication procedures, only PAP is described here. In the PAP, for an authentication request (9162) from the users, a user ID and password are sent. Upon receipt of them, the BAS uses the RADIUS server to check the user ID and password (9163). If they are correct, the BAS formally registers a downstream bandwidth in the OLT, using user information obtained at the same time as authorization (9164). After the formal registration, the BAS sends Authentication-Ack to the users (9165) and terminates the authorization. If the authorization fails, Authentication-Nak is sent to the users and the session ID set in the OLT is discarded. In this case, if the users are to try registration again, they must begin from the establishment of PPPoE session. If the authorization has been correctly made, the setting of networks of the users is performed using IPCP (Internet Protocol Control Protocol)

and the users start communication.

Figure 26:
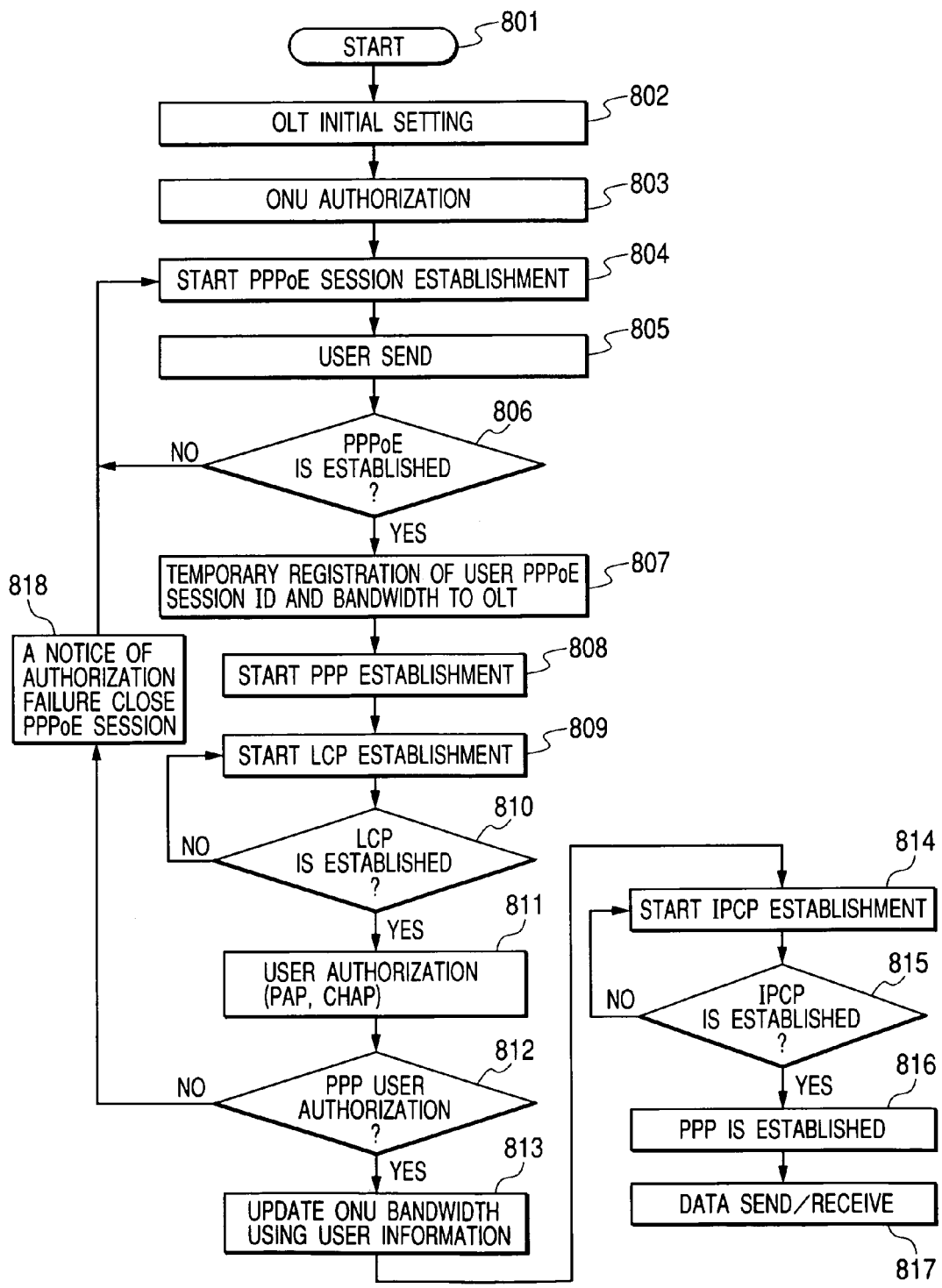
FIG. 26 is a diagram showing a flow of control by BAS in a method of performing bandwidth control for each of users accommodated under ONUs.

Referring to FIG. 26, a detailed description is made of protocol processing and settings performed by the BAS. After the OLT 10 is started, the BAS 28 performs initial setting for the OLT (802). In the initial setting, upstream bandwidths are set for the ONUs. Downstream bandwidths are set when PPP has been established and user authorization has been correctly made. At the termination of the initial setting, the OLT discovers ONUs and authorizes unregistered ONUs, and allocates upstream bandwidths (803). If ONU authorization is correctly made, the users 13 send a packet for establishing PPPoE to the BAS (804). Although downstream bandwidths are not yet set, for a session ID number 0 used to establish PPPoE, a bandwidth for control is allocated in advance during the initial setting. If a PPPoE session ID is decided for the users, the session ID is registered in the OLT. The bandwidth at this time is defined as a bandwidth for control. If PPPoE is correctly established between the BAS 28 and users 13 (806), the users 13 start PPP establishment (808). In the PPP establishment phase, LCP establishment (809), user authorization (811), and IPCP establishment (812) are performed. These are described in order below. In the PPP establishment phase, LCP (Link Control Protocol) for negotiation of the data link layer is executed (809). If LCP is correctly set (810), user authorization is performed. PAP (Password Authentication Protocol) and CHAP (Challenge Handshake Authentication Protocol) can be used as protocols for user authorization; user authorization is performed using either of the protocols (811). If user authorization has been correctly performed (812), user bandwidth information obtained from the RADIUS server 26 during user authorization (811) is set in the bandwidth control table 1068 of the OLT (813). Upon completion of the user authorization (812), IPCP (Internet Protocol Control Protocol) for performing network settings such as user IP setting is executed (814). If the PPP establishment phase is normally terminated, user communication by use of IP is enabled (817).

Figure 12:
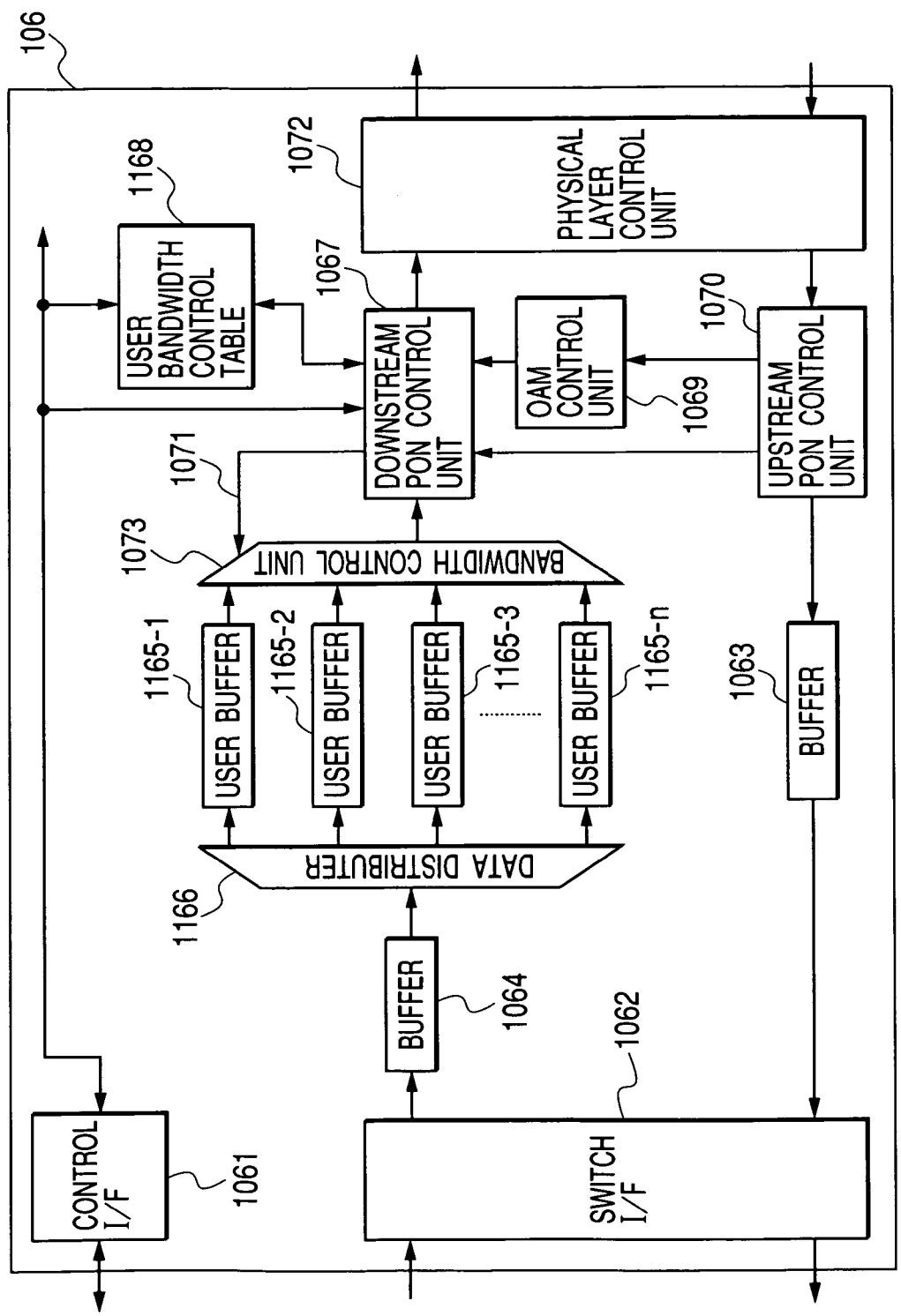
FIG. 12 is a diagram showing the configuration of a PON interface installed in OLT in a bandwidth control method on a user basis.

Referring to FIG. 12, a description is made of the configuration of the PON interface 106 in the case where the above-described method is used. The PON interface 106 comprises: a switch interface 1062; a buffer 1064; a data distributor 1166; a bandwidth control unit 1073; a user buffer 1165; a downstream PON control unit 1067; an upstream PON control unit 1070; an OAM control unit 1067; a physical layer processing unit 1072; a control interface 1061; and a user bandwidth control table 1168.

Figure 13:
FIG. 13 is a diagram showing a user bandwidth control table provided in FIG. 12.

On correctly authorizing users, the BAS 28 sets a user bandwidth based on user bandwidth information in the OLT 10 via the OpS interface. The bandwidth setting information sent from the OpS interface of the BAS or OpS of the OLT terminates in the OpS interface of the OLT and is sent to the control interface 1061 of the PON interface 106 via the system control unit. Upon receipt of the bandwidth setting information, the control interface 1061 writes a user session ID and a bandwidth to be set to the user bandwidth control table 1068 as shown in FIG. 13. A description is made of processing of upstream packets received from users in the PON interface 106. Upon receipt of PPPoE packets sent from the users, the PON interface 106 terminates the physical layer in the physical layer processing unit 1072 and sends them to the upstream PON control unit 1070. The upstream PON control unit 1070 separates additional headers appended to OAM packets and user data from the OAM packets and the user data. The separated user data is sent to a buffer 1063 and sent to a switch through the switch interface 1062. The OAM packets separated in the upstream PON control unit 1070 are sent to an OAM control unit 1069 and system control information is sent to the downstream PON control unit 1067.

A description is made of processing of downstream packets received from the BAS 28 in the PON interface 106. Upon receipt of PPPoE packets sent from the BAS 28, the PON interface 106 stores data in the buffer 1063 via the switch interface 1062. The data distributor distributes packets in the buffer by session ID and stocks them in user buffers managed by session ID. The downstream PON control unit 1067 schedules data reading on the basis of information of a user bandwidth control table 1068, and gives directions to a bandwidth control unit so as to satisfy a bandwidth specified for each user (session ID). The bandwidth control unit 1166 outputs packets of a byte count specified by a session ID supplied from the downstream PON control unit 1173. To avoid fragment processing, setting is made to read data every 1500 bytes so that the data is read in a packet unit, and sending from the session ID is terminated when the number of remaining sendable bytes becomes less than 1500 bytes.

The downstream PON control unit 1067 reads downstream bandwidth information from the user bandwidth control table 1168 and reads data from the user buffers according to bandwidth information. Also, according to requests from the OAM control unit 1069, the downstream PON control unit 1067 inserts OAM packets or sends system control packets. Until the BAS recognizes users and a PPPoE session is established, a PPPoE session ID of 0 is used. Accordingly, this method reserves the ID 0 as ID for system control and allocates a predetermined bandwidth to it in advance.

Figure 16:
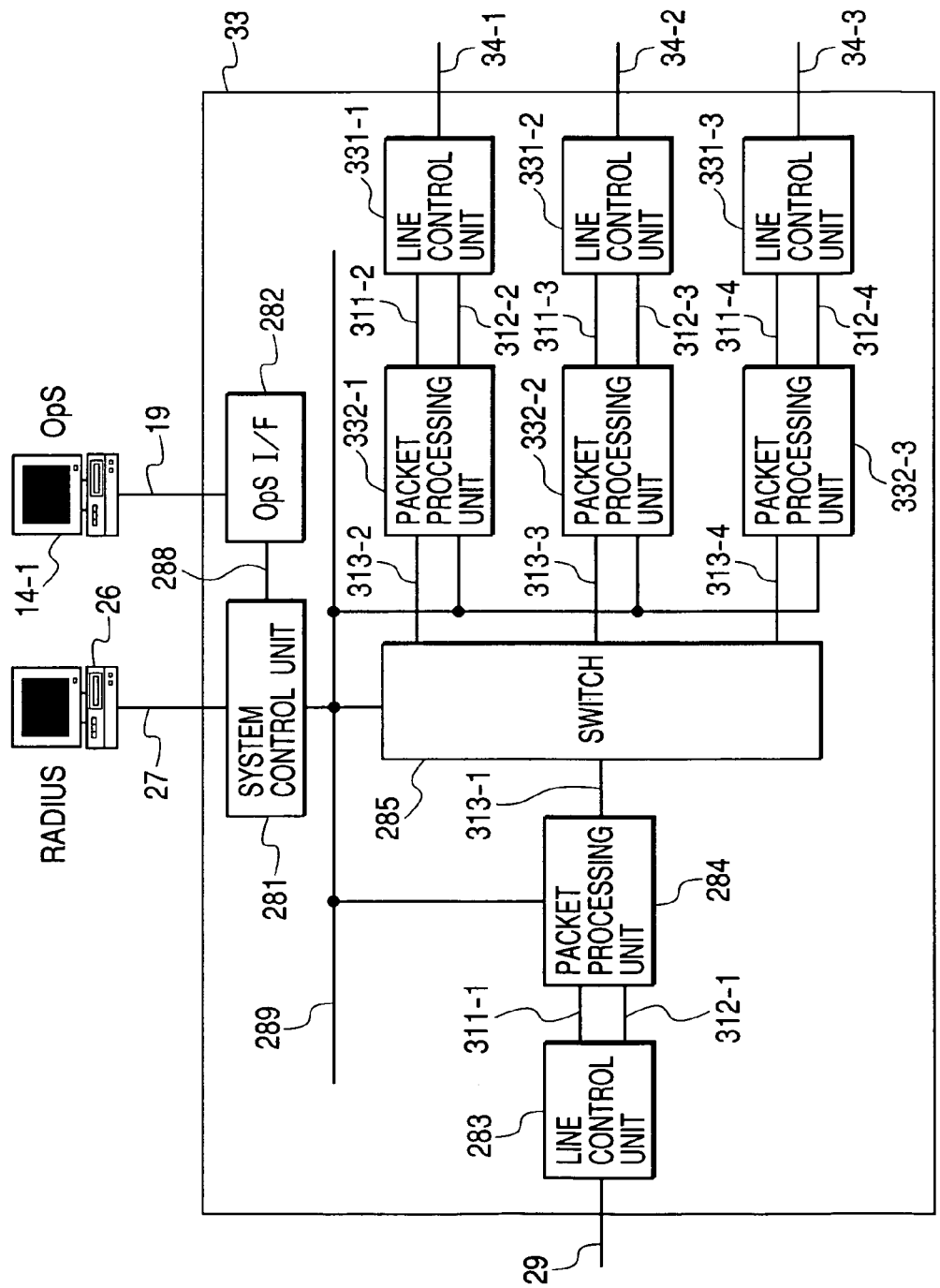
FIG. 16 is a diagram showing the configuration of BAS used in the configuration of FIG. 15 for in-channel communication from the BAS to OLT.
Figure 17:
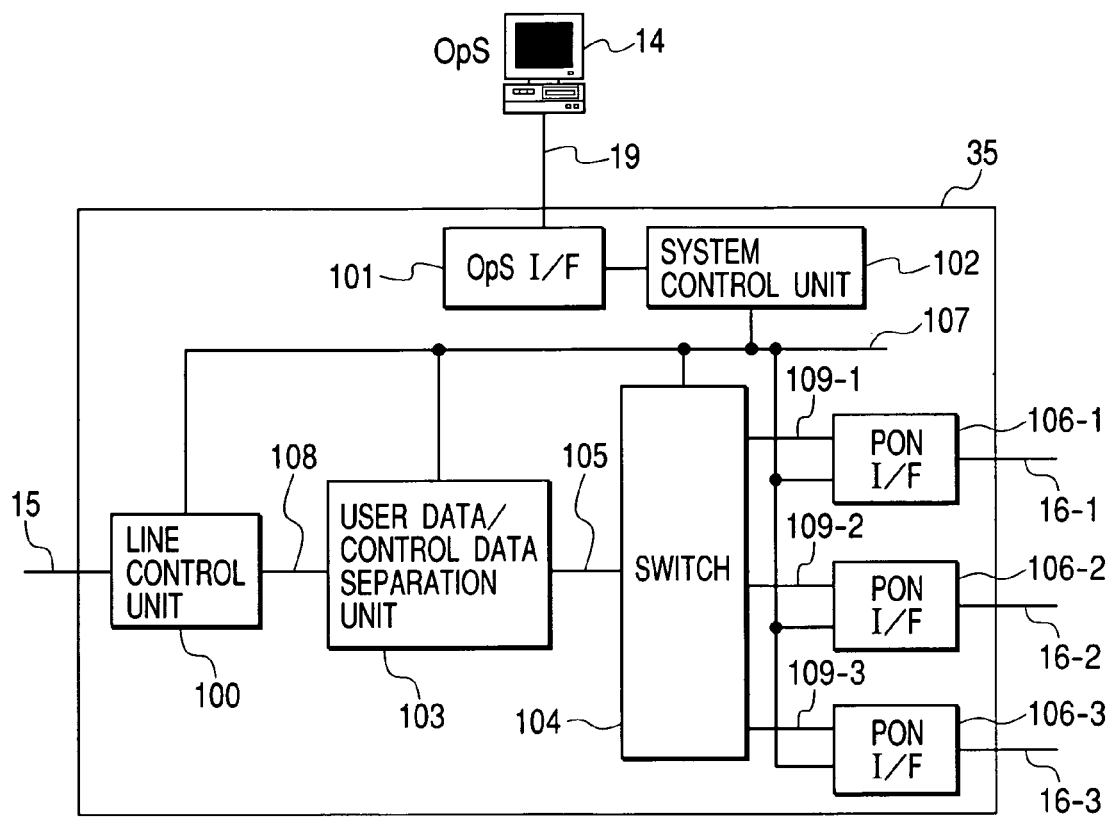
FIG. 17 is a diagram showing the configuration of OLT in the configuration of FIG. 15 for OLT system control by in-channel communication from BAS.

A description is made of a configuration in FIG. 15 in which OLT control is achieved by in-channel communication from the BAS. This method provides no special interface for OLT control and multiplexes user packet and control packets on identical physical lines. In FIG. 8, a special physical line is used to transfer control packets, while, in FIG. 15, a physical line used to transfer control packets is the same line used to transfer user packets. The BAS and the OLT operate in the same way as in FIG. 8. In FIG. 15, the BAS multiplexes control packets on user packets, and the OLT separates the control packets from the user packets. To achieve this function, a control data separation unit is added to the OLT to send control data to the system control unit. Functional blocks of the BAS are shown in FIG. 16 and functional blocks of the OLT are shown in FIG. 17. A flow of control data is described below.

The BAS 33 sends control packets to the OLT 35 through a line interface 34 like normal user packets. PPPoE session IDs exclusively used for system control are assigned to the control packets to distinguish them from user packets and set in PPPoE headers. The control packets are inputted to the line control unit 100 together with user packets and inputted to a user data/control data separation unit 103. The user data/control data separation unit 103 monitors PPPoE session IDs of inputted packets, and on detecting PPPoE session IDs assigned for control, sends the control packets to the system control unit 102 of the OLT. The system control unit 102 sets user bandwidths and performs system settings on the basis of the data of the control packets. The configuration of FIG. 15 allows two bandwidth control methods as the configuration of FIG. 8 does because the former is different from the latter only in means for controlling the OLT.

Figure 19:
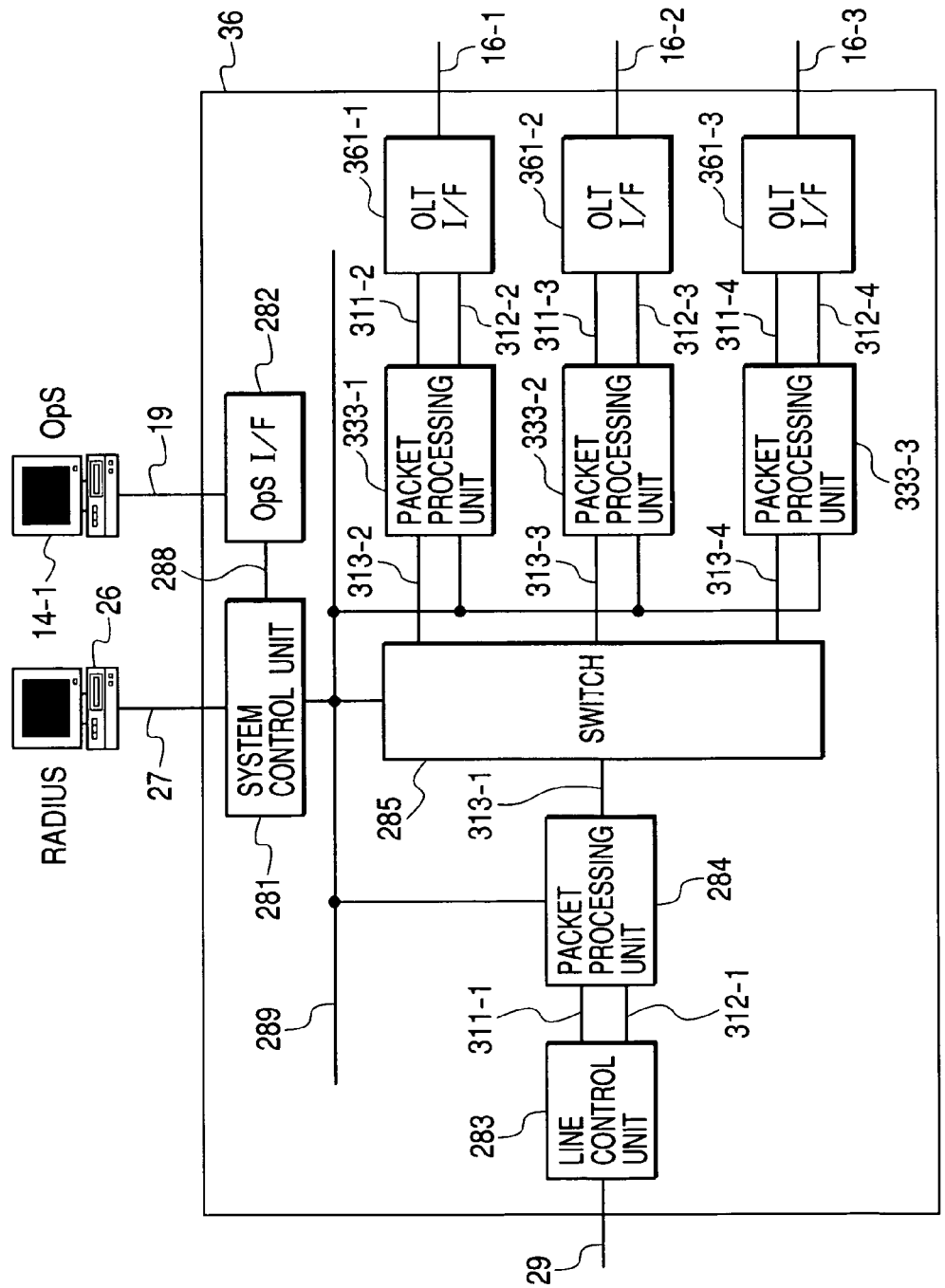
FIG. 19 is a diagram showing the configuration of BAS in FIG. 18 in which OLT is accommodated as a line interface and used integrally with the BAS.
Figure 20:
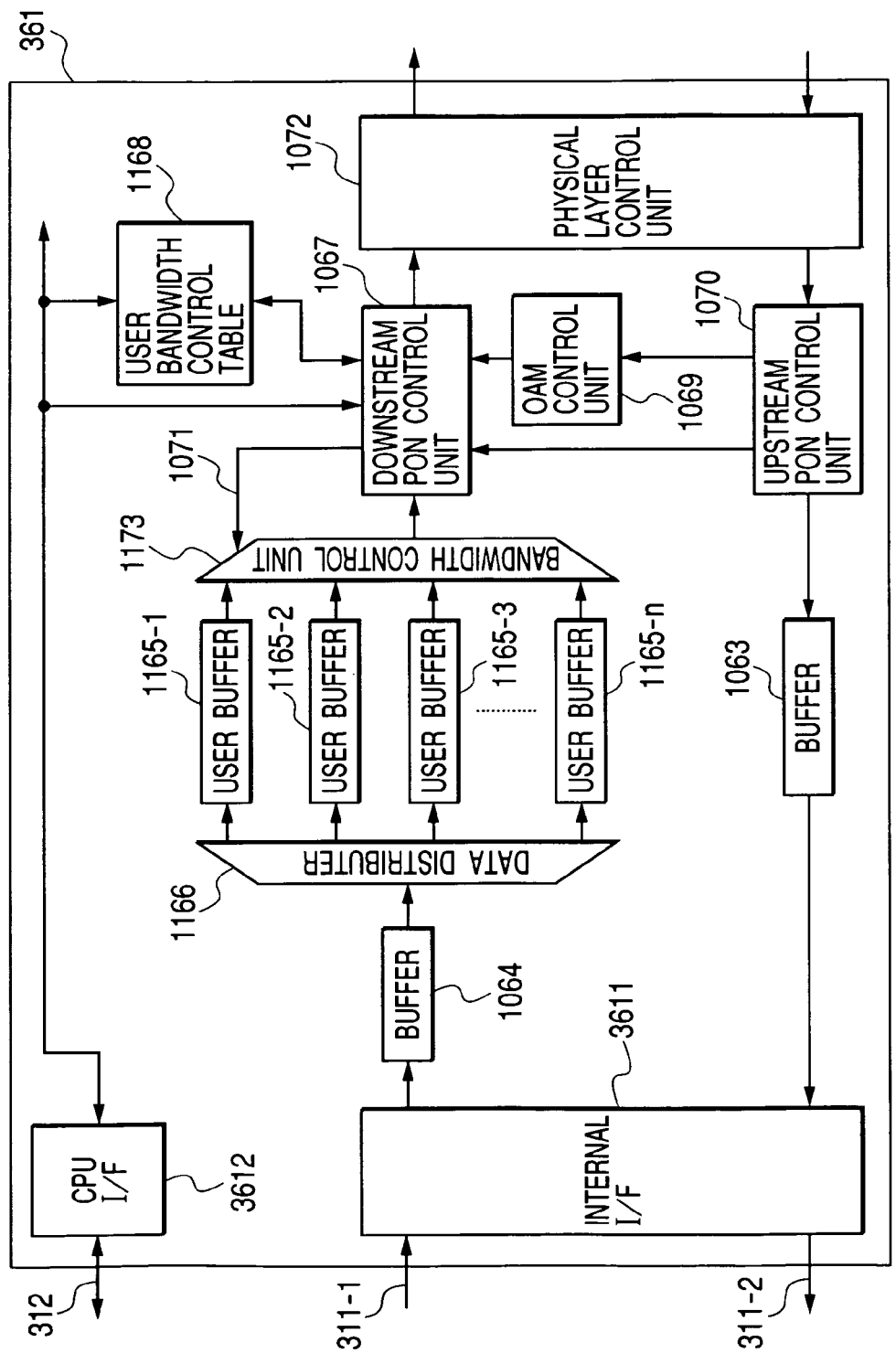
FIG. 20 is a diagram showing the configuration of an OLT interface in FIG. 19 showing the configuration of BAS in which OLT is accommodated as a line interface and used integrally with the BAS.

Next, a configuration in which the BAS and the OLT are integrated is described referring to FIG. 18. In this configuration, a function corresponding to PON interfaces of the OLT is accommodated as a line interface of the BAS. OLT interfaces 361 are connected to packet processing units 332 of the BAS 36, and directly control microcomputer buses 312 of the packet processing units. However, control lines controlling the line interfaces are not limited to microcomputer interfaces because they depend on the configuration of the packet processing units. Procedures for user authorization and downstream bandwidth setting are the same as in the configuration of FIG. 8, except for a procedure for controlling a unit corresponding to the OLT and the installation of OLT interfaces instead of PON interfaces. Referring to FIGS. 19 and 20, a description is made of a procedure for setting user bandwidths in the OLT by use of microcomputer buses.

FIG. 19 is a functional block diagram of the BAS integrated with the OLT wherein the OLT interfaces 361 are installed in the BAS 36. The OLT interfaces are different from the PON interfaces installed in the OLT in that the former includes a CPU interface 3612 corresponding to the microcomputer interfaces serving as control lines from the packet processing units, and an internal interface 3611 through which data is sent and received to and from the packet processing units. In cases where settings for the line control unit of the OLT interfaces 361 are performed from the OpS of the BAS, the BAS performs the settings through the packet processing unit directly connected with the line control unit. System control information of the OLT interfaces 361 received in the OpS Interface 282 of the BAS 36 is inputted to the system control unit 281 and outputted to the microcomputer buses. System control information outputted to the microcomputer buses is transferred to the CPU interface of the OLT interfaces 361 via the packet processing units 332. The CPU interface 3612 transfers the received system control information to the OLT interfaces and performs settings for individual blocks. Also, settings for the OLT interfaces from the packet processing units 332 are performed in the same way using the microcomputer buses of the packet processing units.

Figure 21:
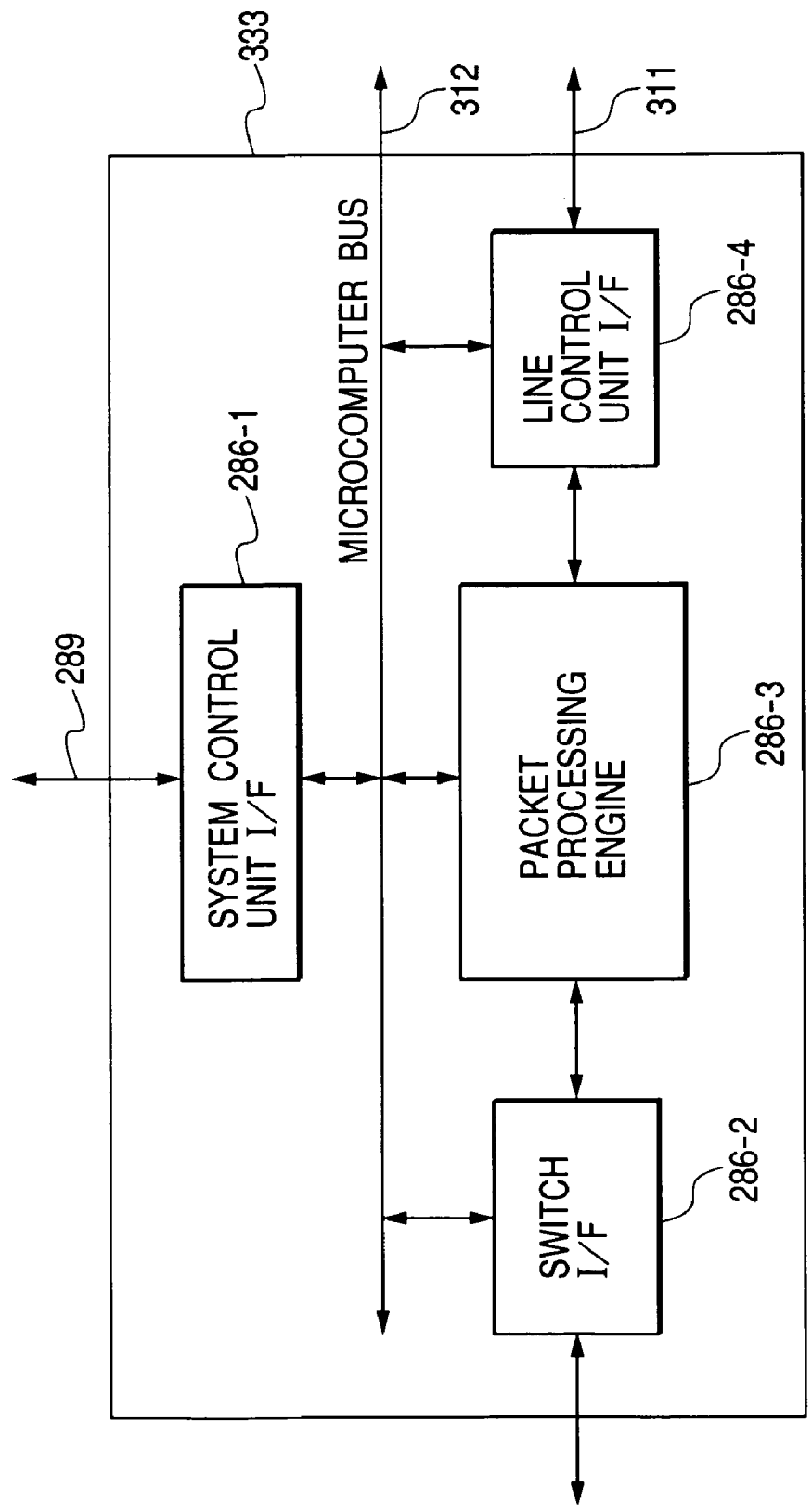
FIG. 21 is a diagram showing the configuration of a packet processing unit in FIG. 19 showing the configuration of BAS in which OLT is accommodated as a line interface and used integrally with the BAS.

FIG. 21 is a functional block diagram of the packet processing units 286. The packet processing units each comprise: a switch interface 286-2 that sends user data to the switch; a packet processing engine 286-3 that includes a microprocessor to perform protocol processing for user packets and decide output paths; a line control unit interface 286-4 that performs conversion between a system control bus 289 within the BAS and the microcomputer buses 312 of the packet processing units 333; and a system control unit interface 286-1 that performs conversion between the system control bus 289 within the BAS and the microcomputer buses 312 of the packet processing units and transfers control information from the system control unit 281 of the BAS to the packet processing units. The direct connection of the control bus 312 of the OLT interfaces 361 to the microcomputer buses enables settings from the OpS and the packet processing engine.

In the configuration of FIG. 18, bandwidth control can be performed by the above-described two methods.

The present invention enables bandwidth control over users under the ONUs. With bandwidth control on an ONU basis, appropriate bandwidths can be allocated by summing the bandwidths of users accommodated in each ONU on the basis of the number of users and user bandwidths obtained by BAS user authorization. With bandwidth control on a user basis, bandwidths assigned to users under ONUs can be allocated.

What is claimed is:

1. A packet communicating system comprising:
an optical line termination (OLT) for subsidiarily connecting optical network units (ONUS) by the passive Optical Network (PON), said OLT having a function for controlling bandwidths between the OLT and the ONUS and transmitting packets to the ONUs; and
a broadband access server (BAS) connected to said OLT, said BAS having a function for authorizing users communicating with the Internet, via the ONUs and the OLT,
wherein said BAS has a function for controlling bandwidths for the users accommodated under the ONUs to send and receive packets, allocated between the ONUS and the OLT, according to the number of users accommodated under the ONUS or bandwidths allocated to the individual users using information of the users obtained from a Remote Authentication Dial IN User Service (RADIUS) server which is connected with the BAS and manages information of the users when authorizing the users to communicate with the Internet.

2. The packet communicating system according to claim 1, wherein the BAS is provided with a special physical line to OLT for system control, and having a function for sending and receiving packets for controlling user bandwidths, and setting bandwidths for the users to send and receive packets, through said special physical line.

3. The packet communicating system according to claim 1, wherein said packet communicating system having a function for sending and receiving user packets using a physical line provided between the BAS and the OLT to send and receive packets for controlling user bandwidths and for setting bandwidths for the users to send and receive packets.

4. The packet communicating system according to claim 1, wherein said BAS having a line interface provided with a function for terminating the physical layer of the PON and controlling the line interface through a system control bus within the BAS, using user information obtained from the RADIUS server during user authorization.

5. The packet communicating system according to claim 4, wherein said packet communicating system having a function for setting a bandwidth for the users to send and receive packets through the line interface using the system control bus within the BAS.

* * * * *